(12) United States Patent
Luk et al.

(10) Patent No.: US 12,053,801 B1
(45) Date of Patent: Aug. 6, 2024

(54) APPARATUSES FOR CHIRAL AND SPONTANEOUS SEPARATIONS OF ENANTIOMORPHOUS OBJECTS

(71) Applicant: Knowledge Makers LLC, Jamesville, NY (US)

(72) Inventors: Liya W. F. Luk, Jamesville, NY (US); Yan-Yeung Luk, Jamesville, NY (US)

(73) Assignee: Knowledge Makers LLC, Jamesville, NY (US)

( * ) Notice: Subject to any disclaimer, the term of this patent is extended or adjusted under 35 U.S.C. 154(b) by 0 days.

(21) Appl. No.: 18/406,145

(22) Filed: Jan. 6, 2024

(51) Int. Cl.
*B07B 13/00* (2006.01)
*G09B 1/16* (2006.01)

(52) U.S. Cl.
CPC .............. *B07B 13/003* (2013.01); *G09B 1/16* (2013.01)

(58) Field of Classification Search
CPC .......... B07B 13/003; G09B 1/16; G09B 1/00; B09B 1/16; B09B 1/00
USPC ........................................................ 209/352
See application file for complete search history.

(56) References Cited

U.S. PATENT DOCUMENTS

| | | | |
|---|---|---|---|
| 2,377,100 A | 5/1945 | Patterson | |
| 2,623,303 A | 12/1952 | Mindel | |
| 2,747,297 A | 5/1956 | Zalkind | |
| 3,280,499 A | 10/1966 | Studen | |
| 3,434,232 A | 3/1969 | Tarrson | |
| D214,928 S | 8/1969 | Swett et al. | |
| 3,760,511 A | 9/1973 | Matsumoto | |
| D231,738 S | 6/1974 | Brass | |
| 4,008,526 A | 2/1977 | Swett et al. | |
| 4,149,717 A | 4/1979 | Seijiro | |
| 4,195,421 A | 4/1980 | Tucker et al. | |
| 4,353,701 A | 10/1982 | Greenberg | |
| 4,508,512 A | 4/1985 | Girsch et al. | |
| D282,940 S | 3/1986 | Thomson et al. | |
| 4,988,321 A | 6/1991 | Goldfarb | |
| 8,084,266 B2 * | 12/2011 | Ishihara | C09B 69/109 422/255 |
| 8,698,031 B2 * | 4/2014 | Kibar | C07C 201/16 435/235.1 |
| 8,814,625 B1 * | 8/2014 | Long | A63H 5/00 446/175 |
| 2020/0010383 A1 * | 1/2020 | Chachisvilis | B01L 3/502 |

* cited by examiner

*Primary Examiner* — Michael McCullough
*Assistant Examiner* — Jessica L Burkman
(74) *Attorney, Agent, or Firm* — Jong Patent Firm; Cheng Ning Jong; Tracy P. Jong

(57) ABSTRACT

Two methods or apparatuses for separating two enantiomorphs of a chiral object. First, the apparatus includes a bended channel, for which the first opening is the orthogonal projection of one enantiomorph in a certain orientation, and the second opening is a different orthogonal projection of the same orientation. At the bend, the channel surface is complementary to the three-dimensional shape of the enantiomorph, which permits one enantiomorph to pass through the second opening, but blocks the other enantiomorph. Second, the apparatus includes a single asymmetric opening that is a small orthogonal projection of the chiral object. Both enantiomorphs of the chiral object can pass through the opening by manual manipulation. By free falling, one enantiomorph will pass through while the other will be blocked. These separation apparatuses are applied to toys, puzzles, and educational tools.

18 Claims, 22 Drawing Sheets

Chiral tetrahedron-cage

APPARATUSES FOR CHIRAL AND SPONTANEOUS SEPARATIONS OF ENANTIOMORPHOUS OBJECTS

BACKGROUND OF THE INVENTION

1. The Field of the Invention

The present invention relates to apparatuses for separating objects of shapes that are mirror images to one another, also known as enantiomorphous solid shapes or enantiomorphs, of chiral objects. These objects of shapes that are mirror images or enantiomorphs, are not the same as they are not superimposable to one another. More specifically, the present invention is directed to apparatuses for separating chiral objects and their enantiomorphs by chiral separation and spontaneous separation.

2. Background Art

In the mid-1800s, the concept and understanding of handedness or "chiral" geometric shapes was first documented, and started to be developed systematically and rigorously according to symmetry, for the notion that certain shapes and their mirror images are different from each other. They are different based on a deciding rule that a shape and its mirror image cannot coincide or superimpose into a shape that is the same as either that shape or its mirror image. In the mid-1900s, all possible symmetries for any shape were established and the solid shapes having high symmetries that can also be chiral were recognized.

The principle of symmetry was applied in toy shape sorters, which was first patented in 1903. To this date, all shape sorter toys still use the same science and principle described in the 1903 patent, which does not involve any chiral solid shapes or chiral symmetry, examples of which can be found in U.S. Pat. Nos. 741,903, 2,377,100, 2,623, 303, 2,747,297, 3,280,499, 3,434,232, D214,928, 3,760,511, D231,738, 4,008,526, 4,149,717, 4,195,421, 4,353,701, 4,508,512, D282,940 and 4,988,321, etc. The appreciation of three-dimensional (3D) shapes and symmetry can be traced to the times of ancient Greece. The notion of handedness and symmetry was developed rather recently, spanning from the 1800s to mid-1900s. The first experimental discovery of handedness involved some crystals having shapes that were different from their mirror images. These crystals rotated the plane polarized light in one direction, whereas their mirror image would rotate the same plane polarized light in the opposite direction. These discoveries led to the notion and the more formal definition of chirality or handedness. Some shapes' mirror images and the shapes themselves cannot be brought to coincide, or fused, or superimposed to become either one of the mirror images, just like a left and a right hand cannot be fused into either left or right hand. While this concept of handedness was defined as chirality in chemistry in the mid-1800s, the notion of handedness or chirality was recognized and described earlier in a conceptual way. It was proposed that because non-symmetric two-dimensional (2D) shapes can be brought to superimpose with its mirror image by performing a rotation in three-dimension, the 3D non-superimposable mirror image shapes can be brought to superimpose by going through a four-dimension rotation, which however is not conceivable by humans who live in a 3D world.

Symmetry is found in all aspects of nature and civilization, and has significance in almost every discipline, e.g., physics, chemistry, biology, architecture, music, psychology, and others. A particularly intriguing aspect of symmetry is chirality. In chemistry, separating the molecules that are mirror images to each other known as enantiomorphs of a chiral molecule is crucial for drug development. Often one enantiomer is therapeutic, the other one is either not active or even toxic. Separating and isolating one enantiomer from its mirror image is always more challenging than separating two entirely different molecules, because without any external chiral influences, all the physical properties between two enantiomers are identical. Thus, resolution for the enantiomers of the chiral molecules is an entire research subject on its own. In nature, all life related molecules are of one handedness but not the other. As enantiomers have the same physical properties, it remains a mystery why one enantiomer is chosen over the other when both seem to be equally probable to exist. Furthermore, some subatomic particles, such as neutrino, only exhibit properties of one handedness but not the other, suggesting the universe is "of only one handedness" rather than the other. Identification and separation are relatively easy between two entirely different shapes, such as a sphere and a cube. However, it is not obvious, and in fact a challenge, to separate between a pair of chiral solid shapes that are mirror images to each other, called enantiomorphous solid shapes or enantiomorphs. To this date, the 3D geometric enantiomorphous solid shapes have not been separated by a physical apparatus, a separation that is more efficient than by, e.g., examination with a human eye and hand picking out one by one. This separation is challenging, because mirror images of a pair of any shapes or things are identical to each other with identical properties, in environments or conditions that have no asymmetric influence.

Any shape can be characterized by a group of symmetry operations. The symmetry operations include reflection planes of symmetry, for which the left and right half of the solid or object are the mirror images to one another; and axes of rotations, for which the object is the same after being rotated by a certain degree. For example, a butterfly has a reflection plane of symmetry, for which the left and right are the same, and has only a rotation axis of 360 degrees. Another example is an equilateral triangular prism having a rotation axis of 120 degrees through the middle of the triangle, and three rotation axes of 180 degrees through the middle points of the three rectangle faces. It also has three vertical reflection planes of symmetry cutting through the three "heights" of the equilateral triangle, and one horizontal reflection plane of symmetry cutting through the middle of the length of the prism. Groups of these elements will be assigned a symmetry point group. It shall be noted that there is only one possibility for the most symmetric shape, i.e., a sphere, which has an infinite number of reflection planes and rotational axes. The least symmetric shape has only one operation, rotation of the object by 360 degrees (C1), and, yet there are infinitely many different shapes that fulfill this symmetry. In general, the higher the symmetry, i.e., with more possible symmetry operations, the fewer examples of possible shapes that can fulfill these symmetries. Without any asymmetric or chiral influence, enantiomorphic solids have identical physical properties, and are impossible to separate. In the field of chemistry, the technology for resolving small enantiomeric molecules has been demonstrated and improved since the discovery of chirality at molecular level. For instance, to achieve the separation of any pairs of enantiomorphous solid shapes, we first examine how nature achieves distinguishing between chiral entities, small molecules, and proteins. In a living system, a protein would selectively recognize and bind one chiral molecule, while rejecting its mirror image molecule. One important factor for this selective recognition is accomplished by a protein having the binding site with a chiral surface that is complementary to the shape of one chiral molecule but not its mirror image. This recognition can lead to a chemical reaction that changes the structures of the bound chiral molecule or bring two together to build a new one. For chiral shapes, the selection and separation of enantiomorphs by a physical apparatus has never been achieved. Chiral solid shapes have a wide variety of symmetries. Any chiral shapes is characterized by one of the following six classes of chiral symmetry groups, denoted by C1, Cn, Dn, T, O, I, for which n=2,3,4, . . . , etc. The symmetry point groups C1 and Cn symmetries (n=2,3,4, . . . ) are for chiral objects that have only one kind of operation: the rotation axis that when the object is rotated 360/n degree around that axis, the object will look identical. Dn symmetries are for chiral objects that have a Cn axis, but with also n C2 axes that are perpendicular to the Cn axis. T symmetry is for chiral objects that have 4 C3 axes, and 3 C2 axes. O symmetry is for chiral objects that have 3 C4 axes, 4 C3 axes, and 6 C2 axes. I symmetry is for chiral objects that have 6 C5 axes, 10 C3 axes, 15 C2 axes. These chiral symmetry groups have the characteristics of having only rotational axes, and have no reflection plane of symmetry. However, it is possible for an object to have no reflection symmetry, and still are not chiral. Thus, the most important and sufficient requirement for a shape or object to be chiral is that the object and its mirror image is not superimposable. While these chiral symmetries encompass vastly different shapes and characteristics, the scope of this invention provides methods and apparatus to separate chiral shapes without moving parts with any of these chiral symmetries. As an example of application related to symmetry, the existing shape sorter toys are limited to simple symmetries that involve no chirality. Since its invention in 1903, these shape sorters are proposed to be for 2-5 years old toddlers. Playing with these toys beyond 5 years is rather meaningless, and would potentially hinter the intellectual and mental development of a child.

Thus, there exists a need for a shape sorter that is more meaningful to solve and more engaging to use, and that can benefit users of all ages. There further exists a need for an apparatus useful for understanding that there are infinite amount of chiral shapes beyond hands, ears, feet, gloves and shoes, as well as for understanding how to separate these nonsuperimposable mirror images or enantiomorphs of chiral objects.

SUMMARY OF THE INVENTION

In accordance with the present invention, there is provided a separation apparatus for separating a chiral object from its enantiomorph or its mirror image, the separation apparatus including:
a first enclosed channel including a first opening and a second opening, wherein the first opening including a first shape characterized by a first projection of the chiral object disposed in a first orientation and the second opening including a second shape characterized by a second projection of the chiral object disposed in a second orientation, wherein the first shape extends from the first opening through a first portion of the first enclosed channel, the second shape extends from the second opening through a second portion of the first enclosed channel to coincide with the first portion of the first enclosed channel to form an intersection having a surface complementary to the chiral object disposed in the first orientation with respect to the first opening and the second orientation with respect to the second opening,
wherein when the chiral object is disposed in the first orientation, the chiral object includes a third projection matching the first shape and a fourth projection matching the second shape, the chiral object is separable from an enantiomorph of the chiral object via at least one of the first opening and the second opening.

In one embodiment, the separation apparatus further includes a second enclosed channel including a third opening and a fourth opening, wherein the third opening including a third shape characterized by a first projection of the enantiomorph of the chiral object disposed in a third orientation and the fourth opening including a fourth shape characterized by a second projection of the enantiomorph of the chiral object disposed in a fourth orientation, wherein the third shape extends from the third opening through a first portion of the second enclosed channel and the fourth shape extends from the fourth opening through a second portion of the second enclosed channel to coincide with the first portion of the second enclosed channel, wherein when the enantiomorph of the chiral object is disposed in the third orientation, the enantiomorph of the chiral object includes a fifth projection matching the third shape and a sixth projection matching the fourth shape, the enantiomorph of the chiral object is separable from the chiral object via at least one of the third opening and the fourth opening. In one embodiment, at least one of the first enclosed channel and the second enclosed channel is non-rectilinear. In one embodiment, the third orientation and the fourth orientation are disposed at a right angle to one another. In one embodiment, the third orientation and the fourth orientation are disposed at an angle other than a right angle to one another. In one embodiment, the third opening includes an area and the area of the first projection of the enantiomorph of the chiral object is smaller than the first area by about 1-5% of the area of the third opening. In one embodiment, the first orientation and the second orientation are disposed at a right angle to one another. In one embodiment, the first orientation and the second orientation are disposed at an angle other than a right angle to one another. In one embodiment, the first opening includes an area and the area of the first projection of the chiral object is smaller than the first opening area by about 1-5%. In one embodiment, the chiral object can be of any of the six classes of chiral symmetries, C1, Cn, Dn, T, O and I. In one embodiment, the separation apparatus is a physical object without moving parts. In one embodiment, each of the first opening and the second opening is asymmetrical in shape. In one embodiment, the separation apparatus is a computer model. In one embodiment, each of the first opening and the second opening is asymmetrical in shape.

In accordance with the present invention, there is further provided a separation apparatus for separating a pair of enantiomorphous solids or shapes of mirror images of the chiral object, the separation apparatus including:
a first opening and a second opening, wherein the first opening including a first shape characterized by a first projection of the chiral object disposed in a first orientation and the second opening including a second shape characterized by a second projection of an enantiomorph of the chiral object,
wherein when the chiral object is disposed in the first orientation, the chiral object includes a third projection matching the first shape, the chiral object is separable from the enantiomorph of the chiral object via at least one of the first opening and the second opening.

In one embodiment, the first opening and the second opening are opposingly disposed from one another and the first opening and the second opening are the same opening. In one embodiment, the chiral object can be an object exhibiting symmetry elements or characterizations of one of C1, Cn, Dn, T, O or I. In one embodiment, the chiral object is separable from the enantiomorph of the chiral object via at least one of the first opening and the second opening with the aid of free falling by gravity through the at least one of the first opening and the second opening. In one embodiment, the chiral object is separable from the enantiomorph of the chiral object via at least one of the first opening and the second opening by flipping the at least one of said first opening and said second opening upside down. In one embodiment, the separation apparatus is a computer model. In one embodiment, each of the first opening and the second opening is asymmetrical in shape.

An object of the present invention is to provide a separation apparatus configured for separating the enantiomorph of a chiral object from its mirror image.

Another object of the present invention is to provide a separation apparatus configured for separating a chiral object from the enantiomorph of the chiral object by way of either chiral separation or spontaneous separation.

Another object of the present invention is to provide a separation apparatus where the separation of an enantiomorph and its mirror image shape can be aided by gravity.

Another object of the present invention is to provide a more engaging shape sorter toy as it requires a higher level of thinking to sort chiral and achiral, i.e., not chiral objects, and to sort the enantiomorphs of a chiral object.

Another object of the present invention is to provide a sorter toy which can capture the attention of its user for a longer time span as it requires a higher level of thinking to sort chiral objects for their enantiomorphs.

Another object of the present invention is to provide a dexterity puzzle toy which can train the manual capability of a user in extracting both enantiomorphs from a container having an opening and that one enantiomorph is more difficult to extract than the other and one that is useful for teaching the high level thinking and understanding of chirality.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

Figure 1:
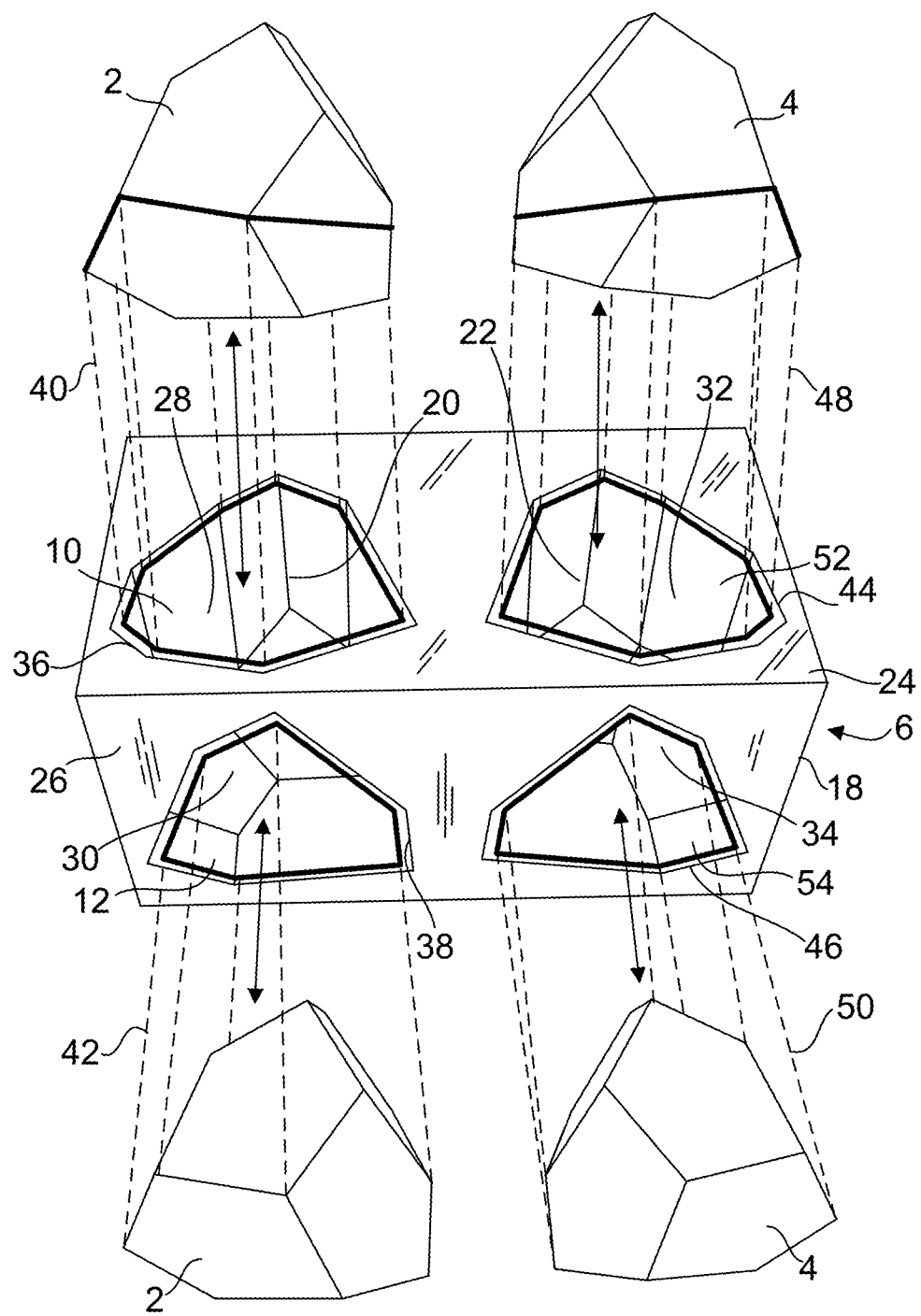
FIG. 1 is a top front perspective view of a chiral separation apparatus, depicting a pair of enclosed channels each for separating a chiral object from its enantiomorph.
Figure 2:
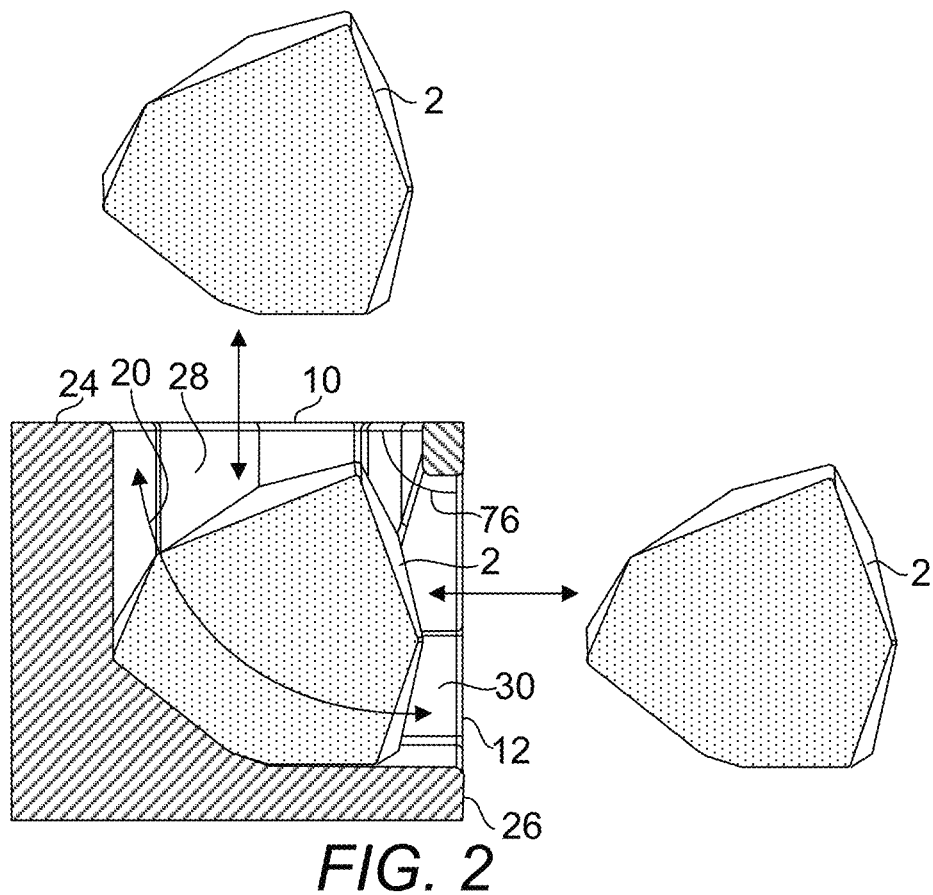
FIG. 2 is a side cross-sectional view of a first enclosed channel of the chiral separation apparatus of FIG. 1.
Figure 2A:
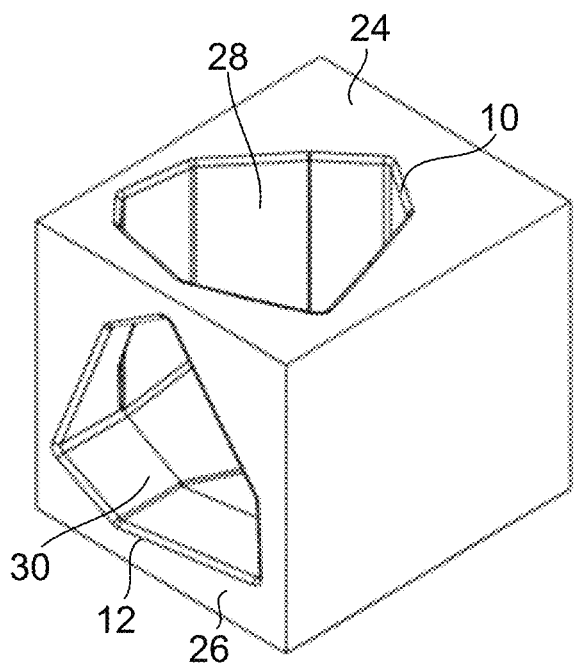
FIG. 2A is a top perspective view of a first enclosed channel of the chiral separation apparatus of FIG. 1, depicting surfaces complementary to surfaces of the chiral object at the bend of the first enclosed channel for the chiral separation apparatus.
Figure 2B:
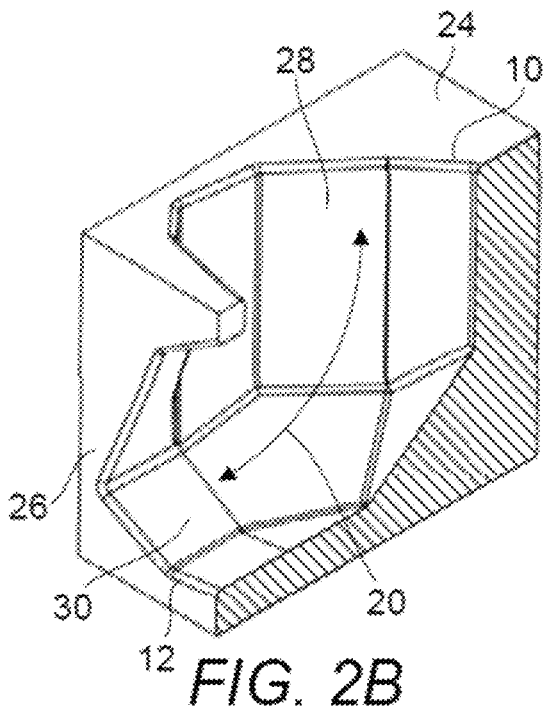
Figure 2C:
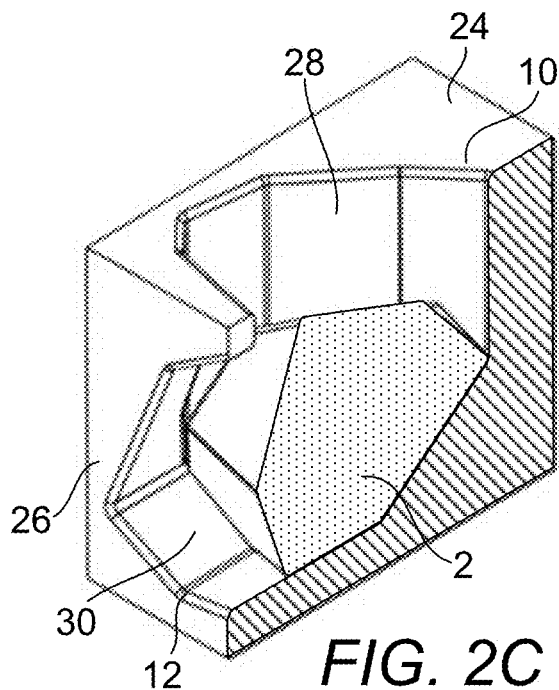
Figure 3:
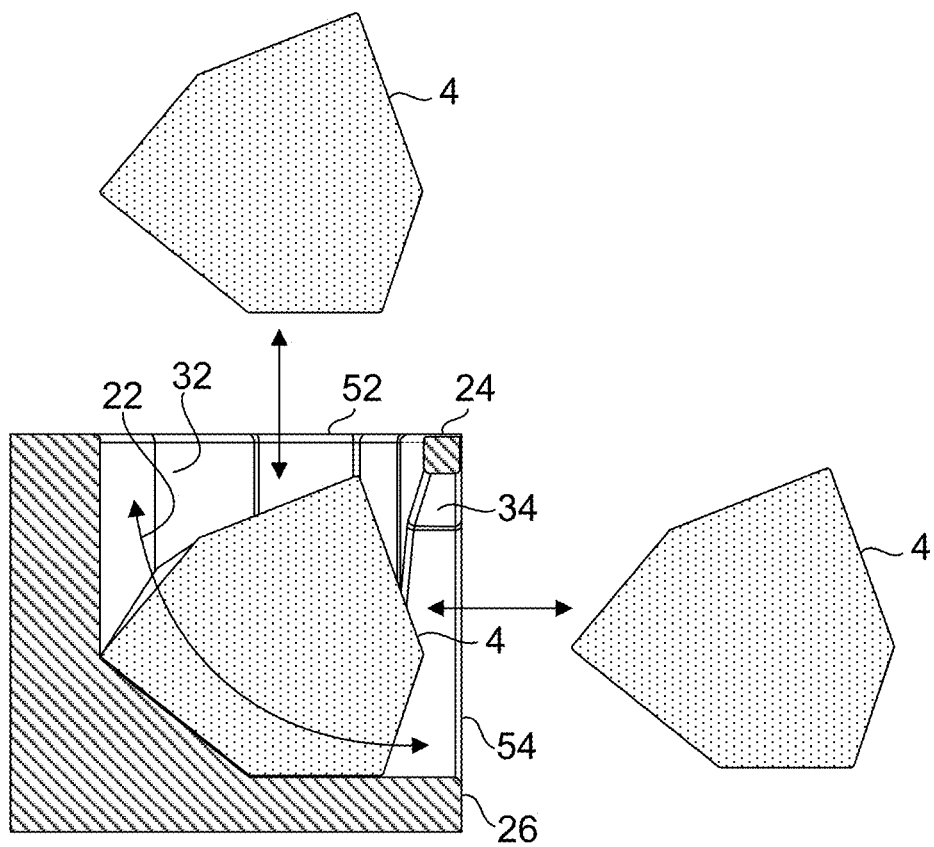
Figure 3A:
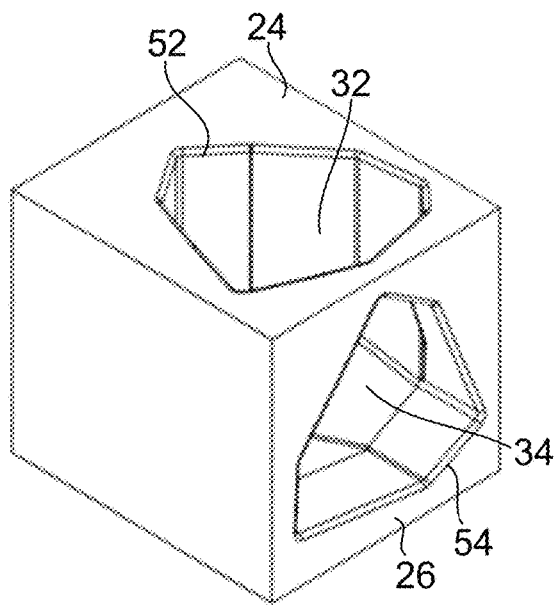
Figure 3B:
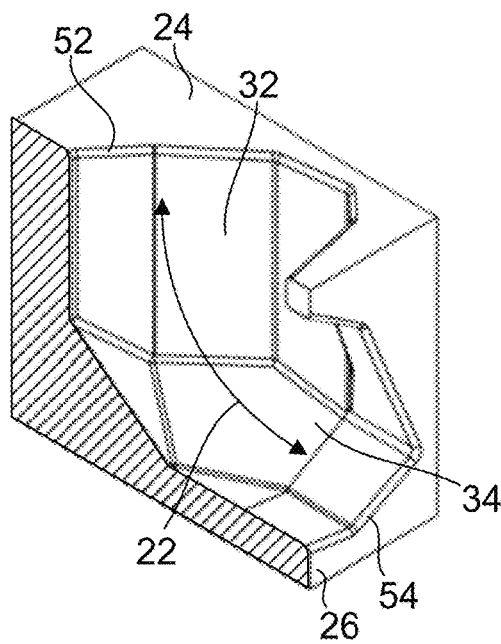
Figure 3C:
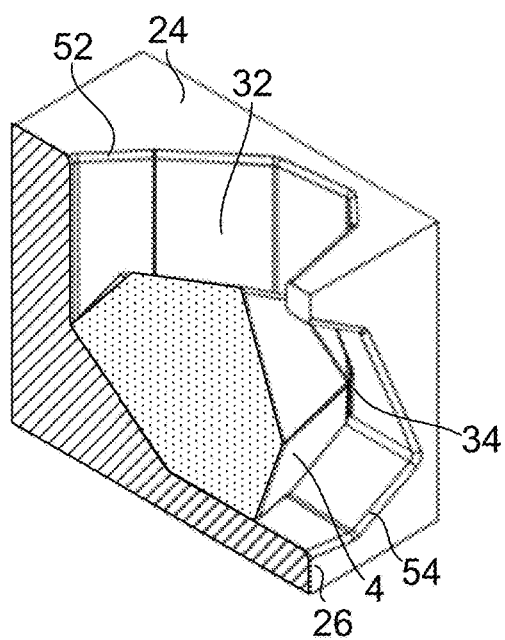
Figure 3D:
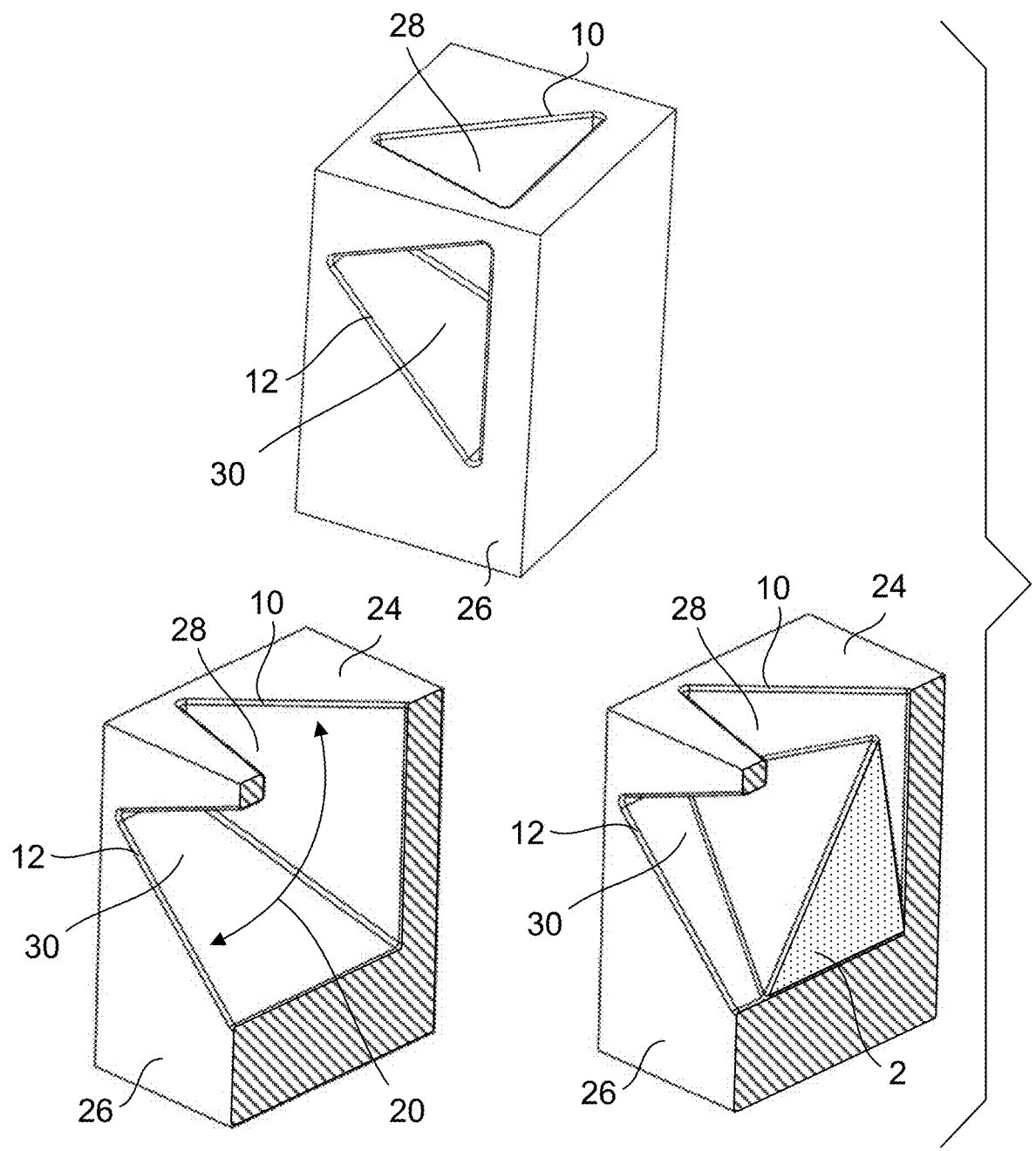
Figure 3E:
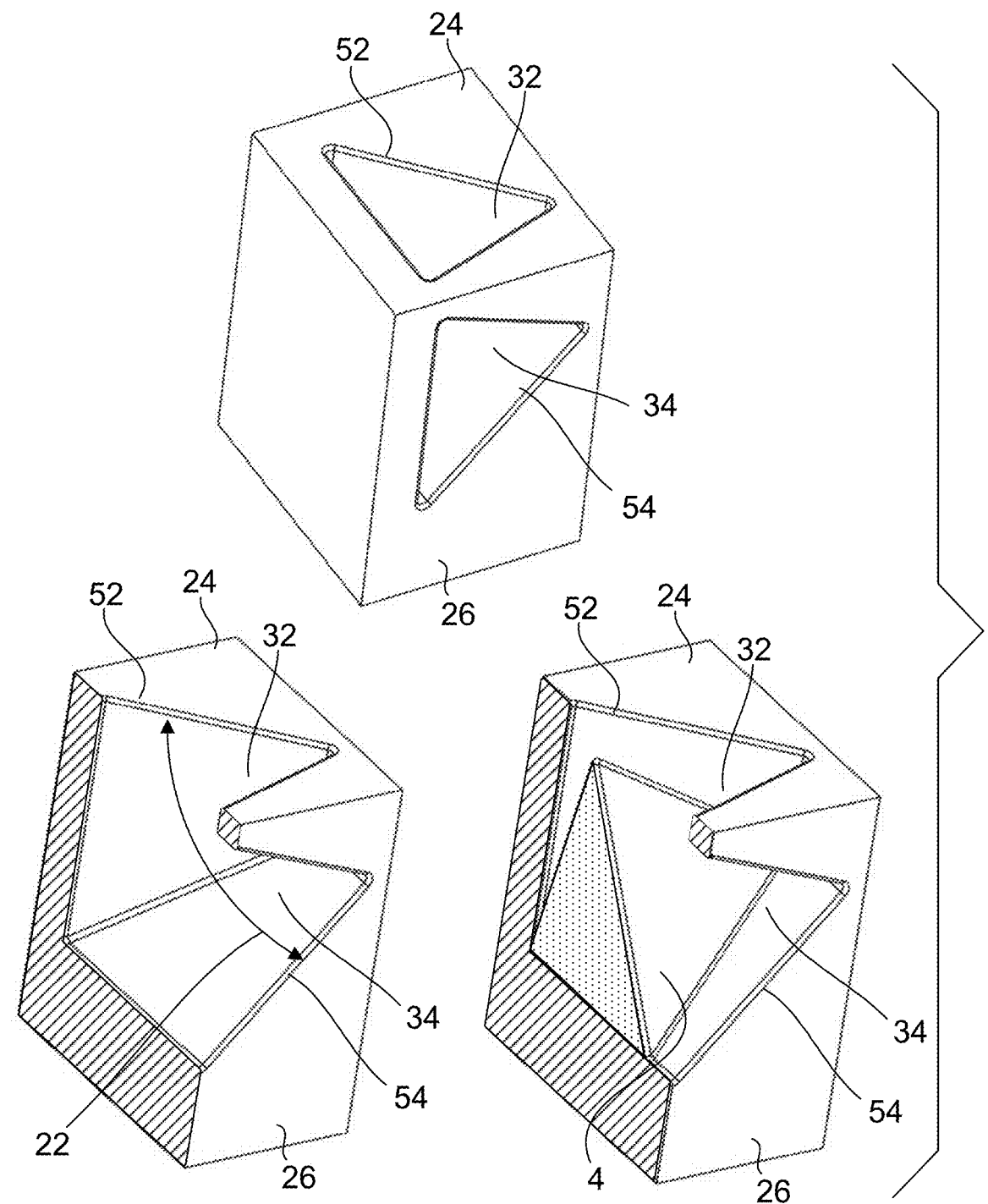
Figure 3F:
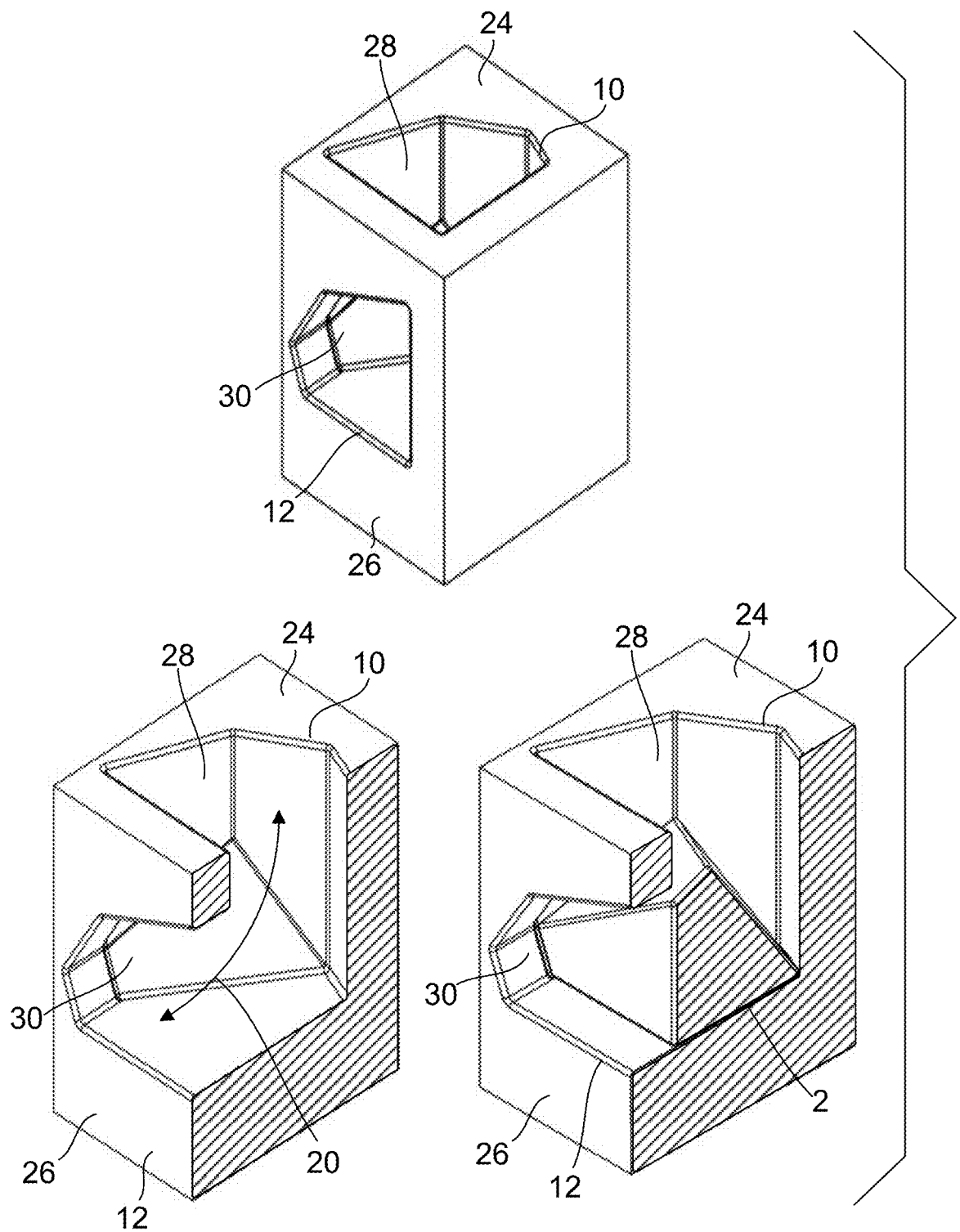
Figure 3G:
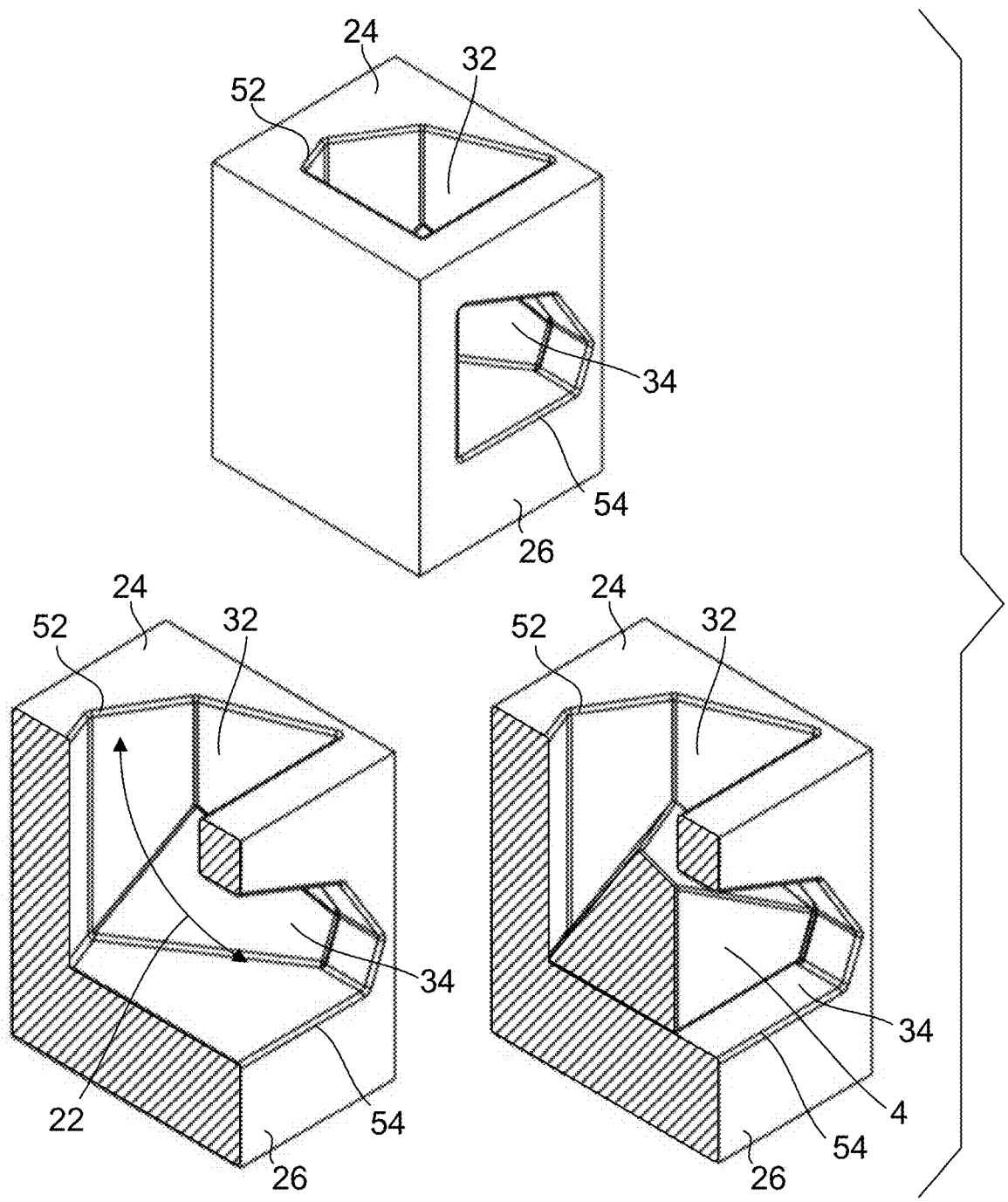
Figure 4:
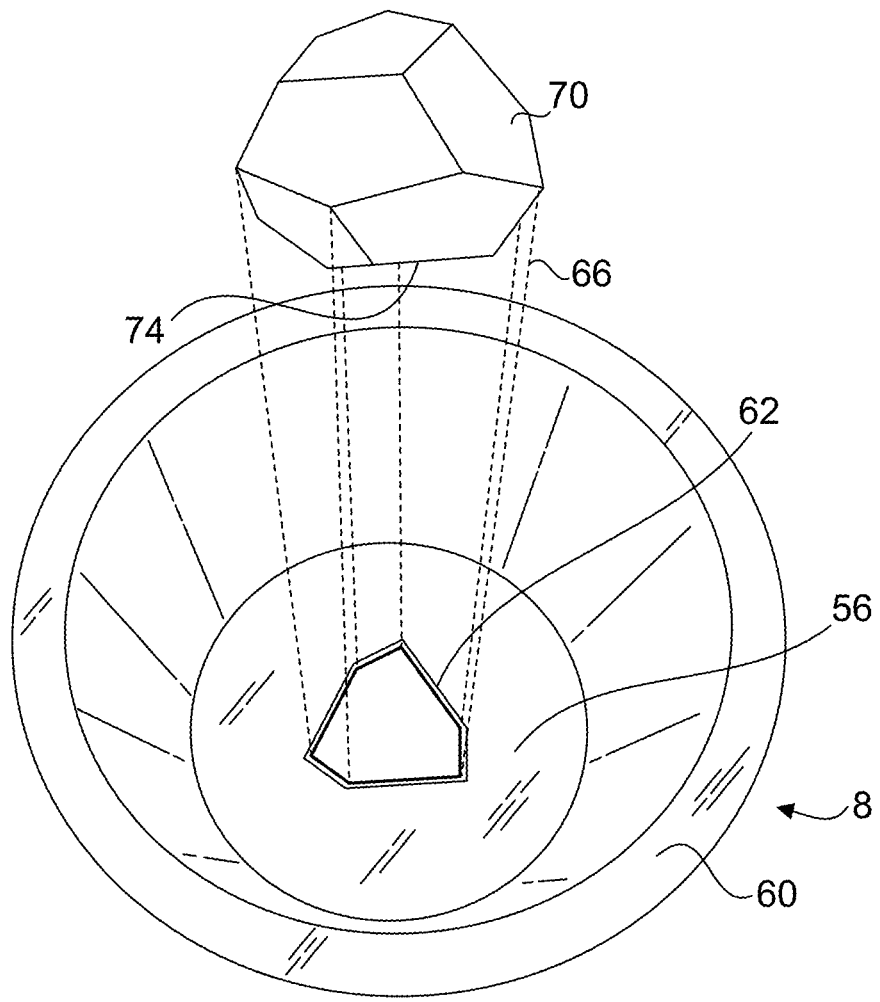
Figure 5:
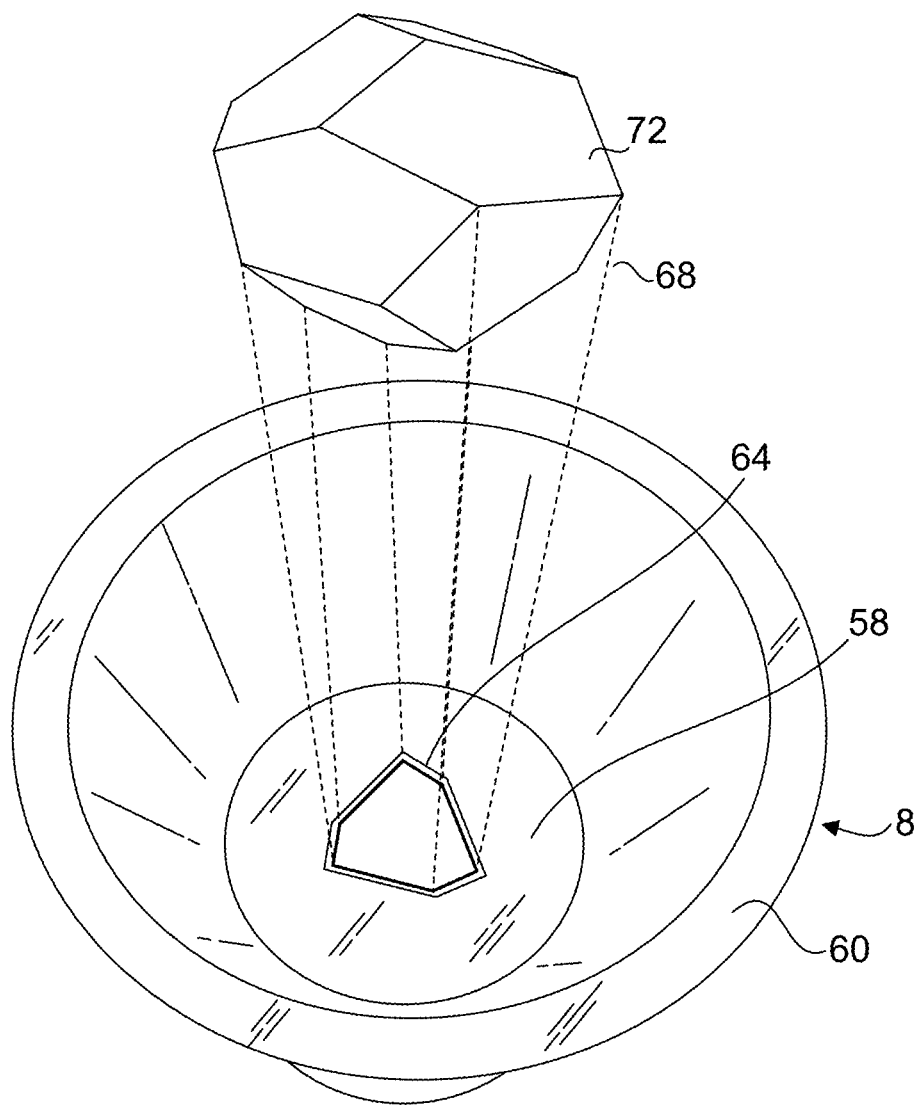
Figure 5A:
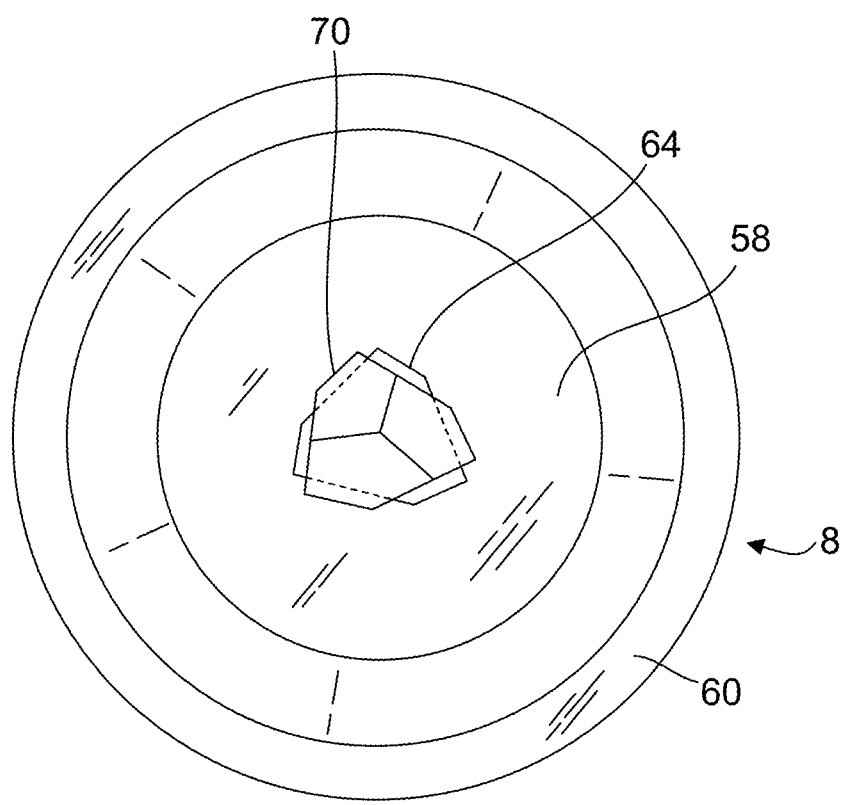
Figure 6:
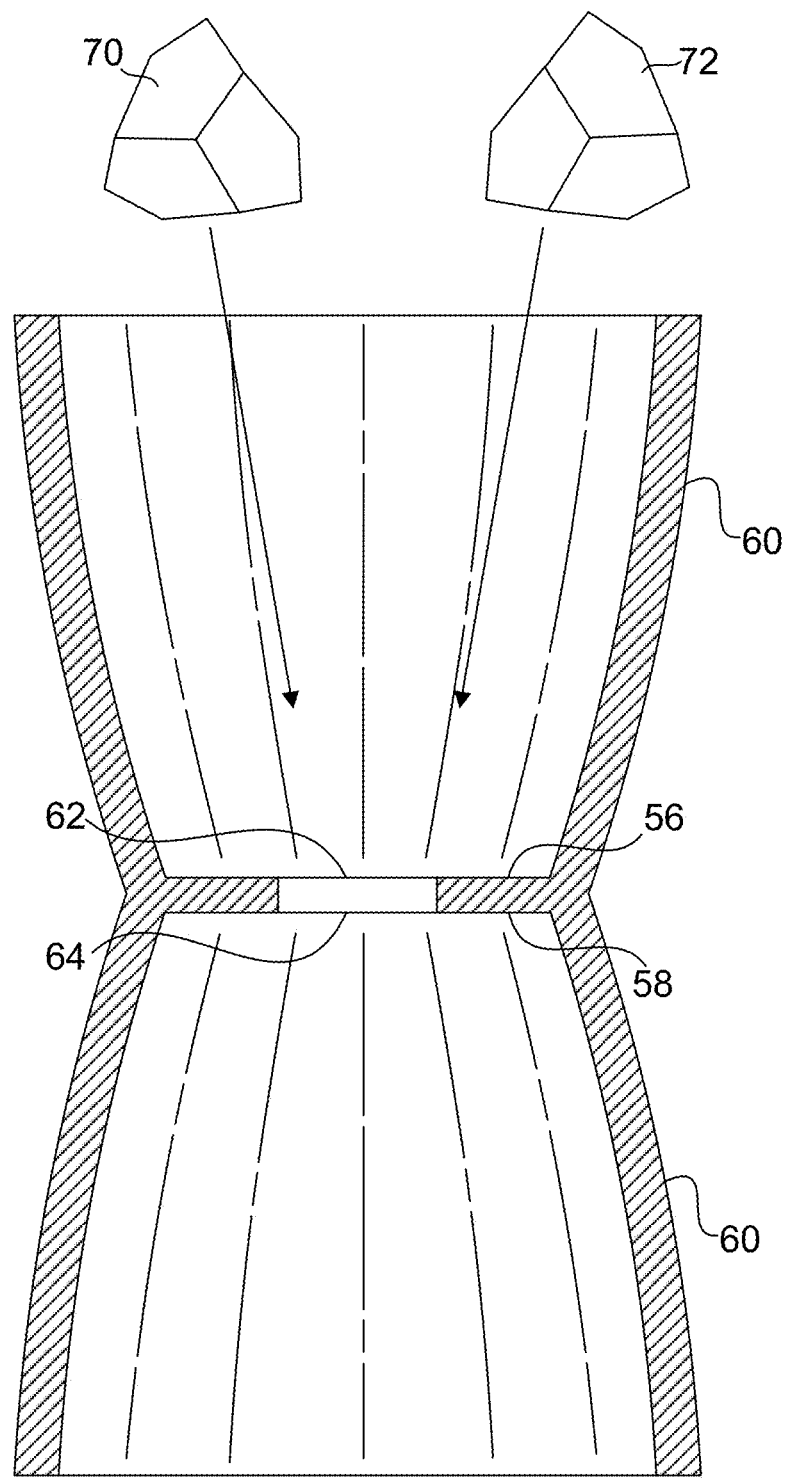
Figure 6A:
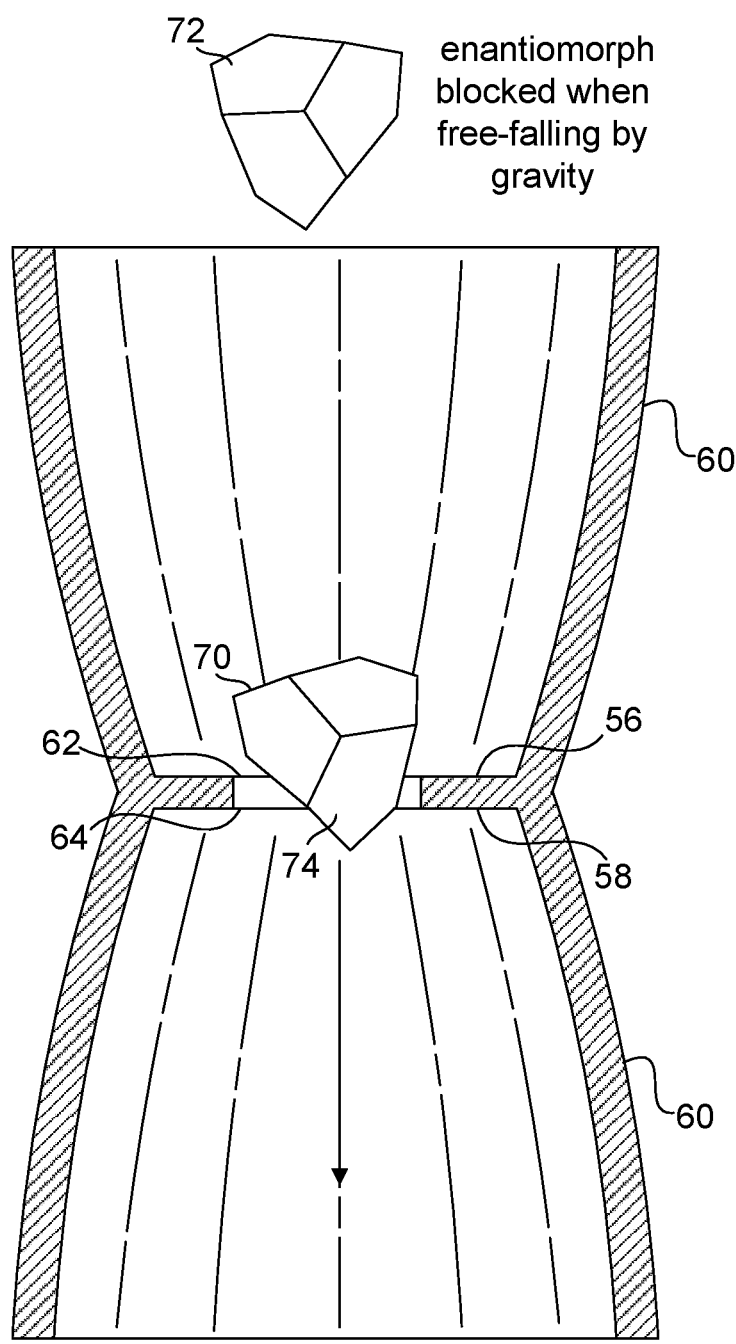
Figure 6B:
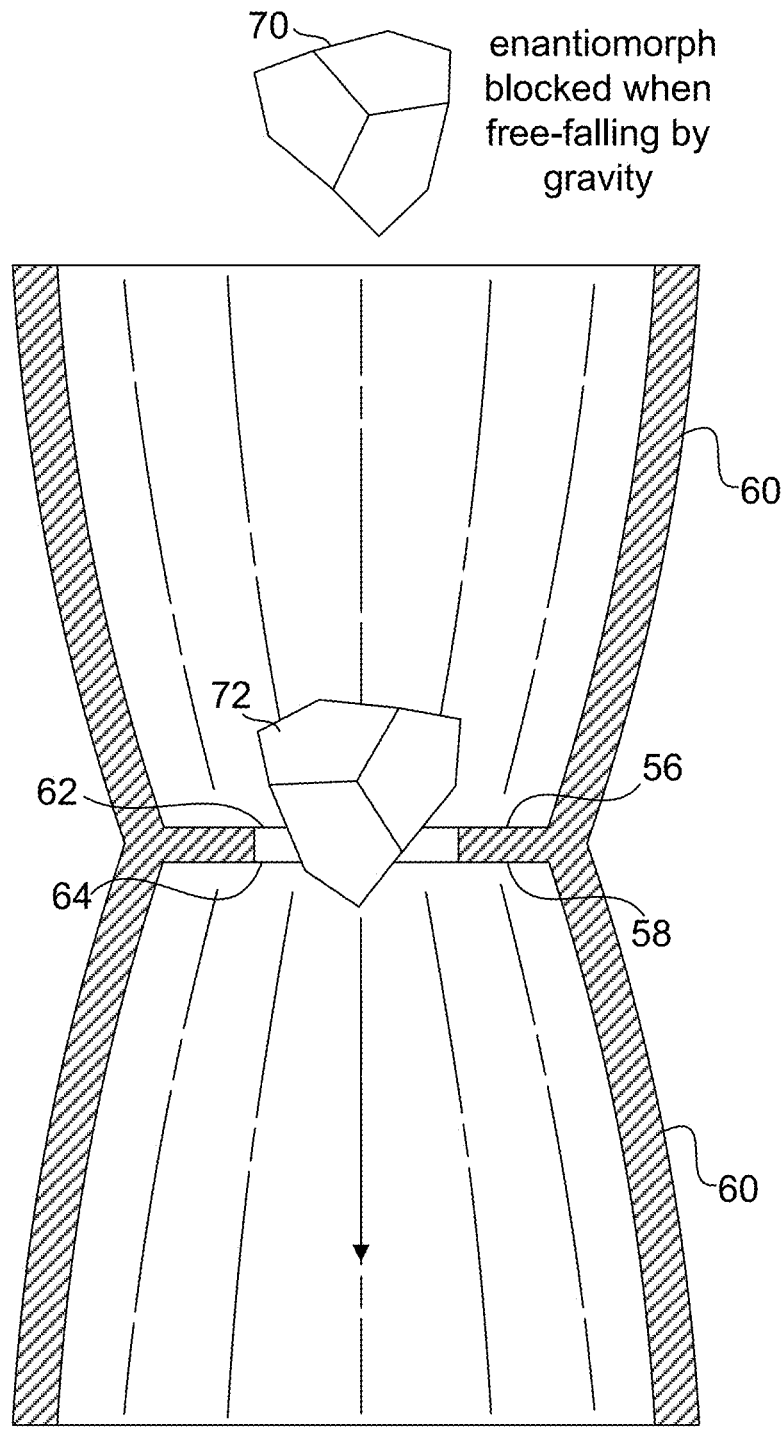
Figure 7A:
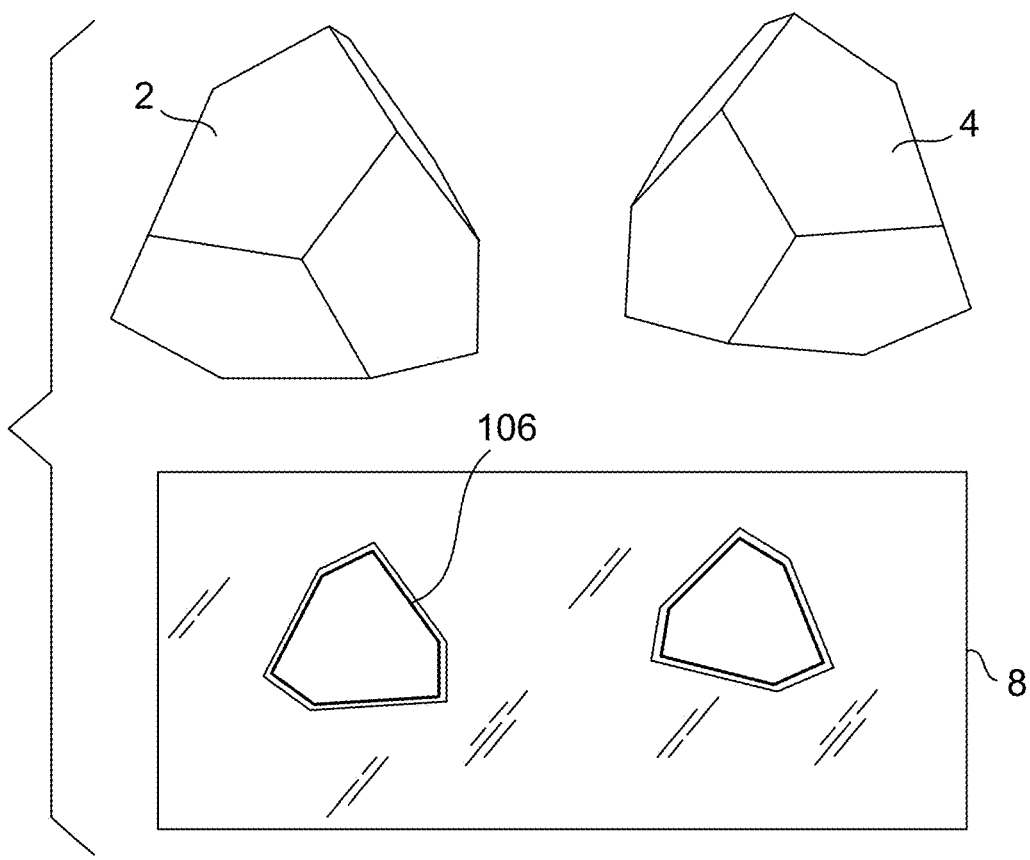
Figure 7B:
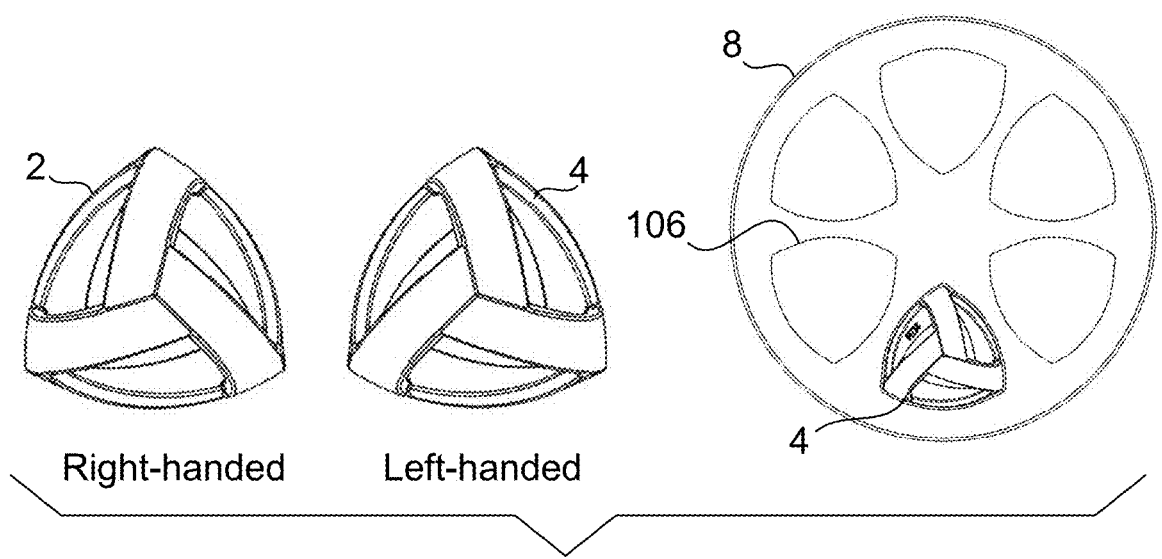
Figure 7C:
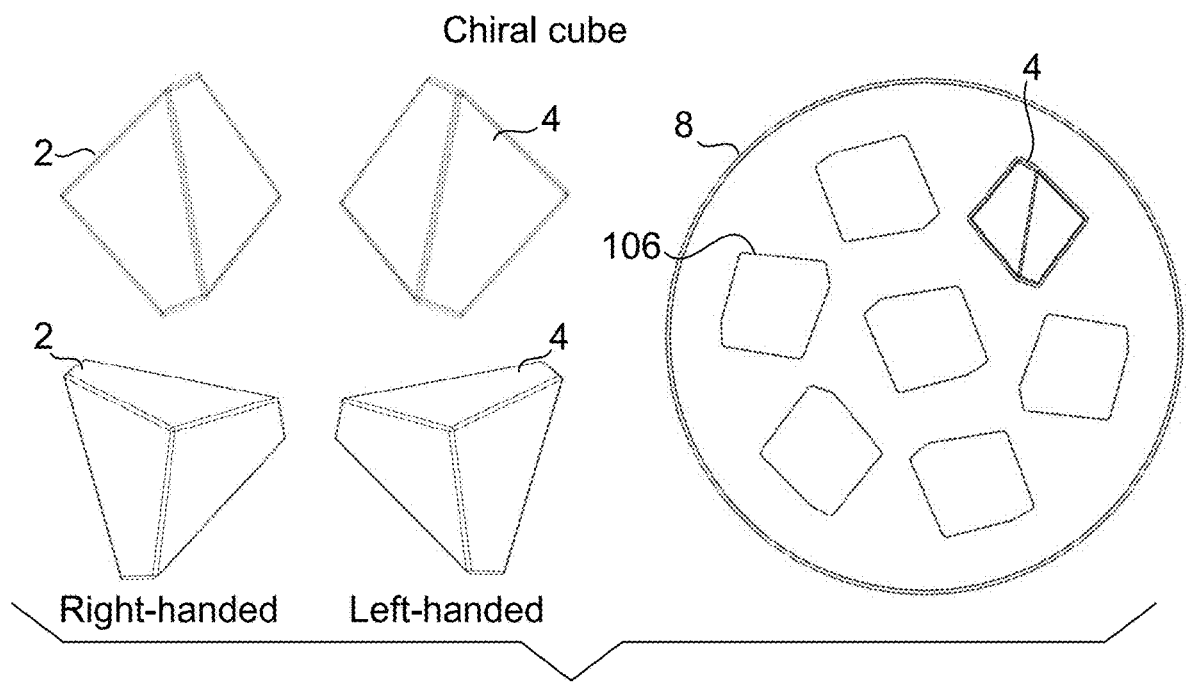
Figure 7D:
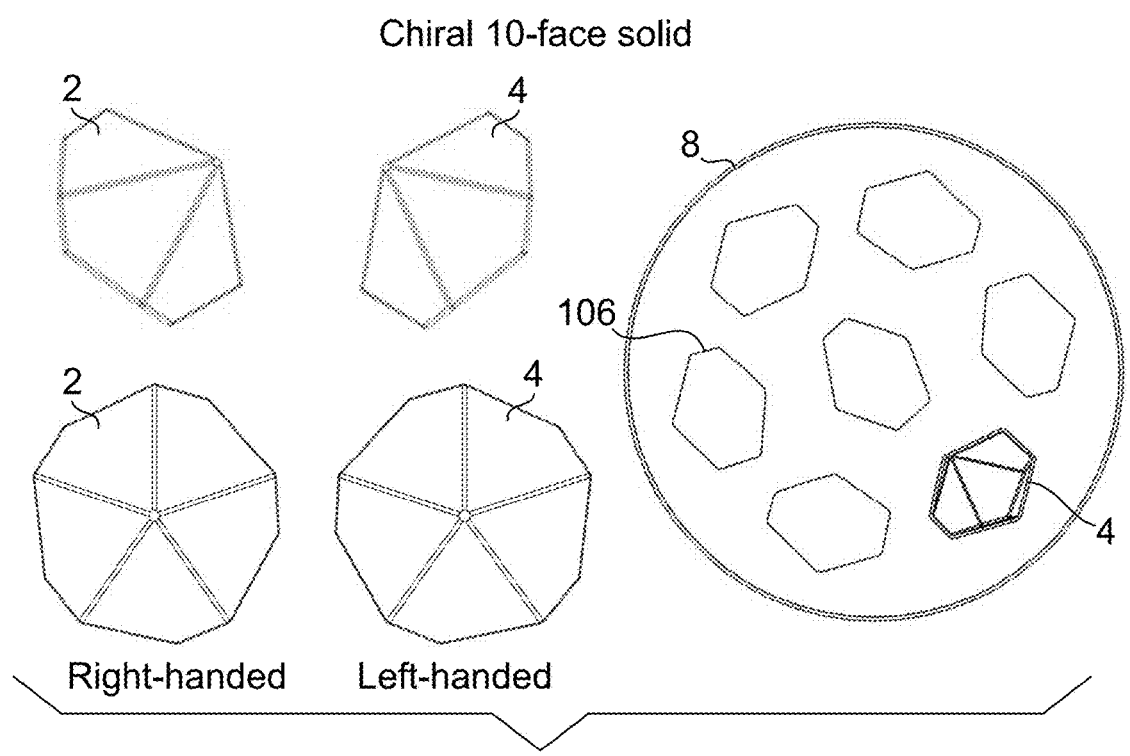
Figure 7E:
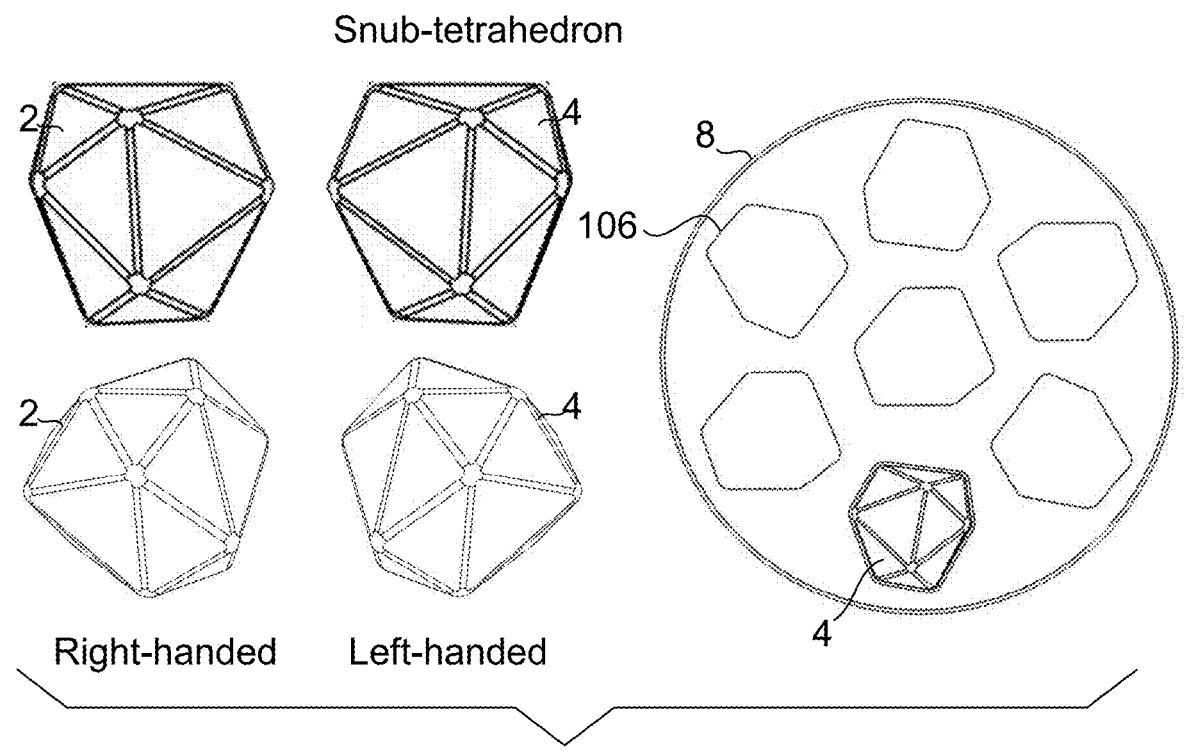
Figure 7F:
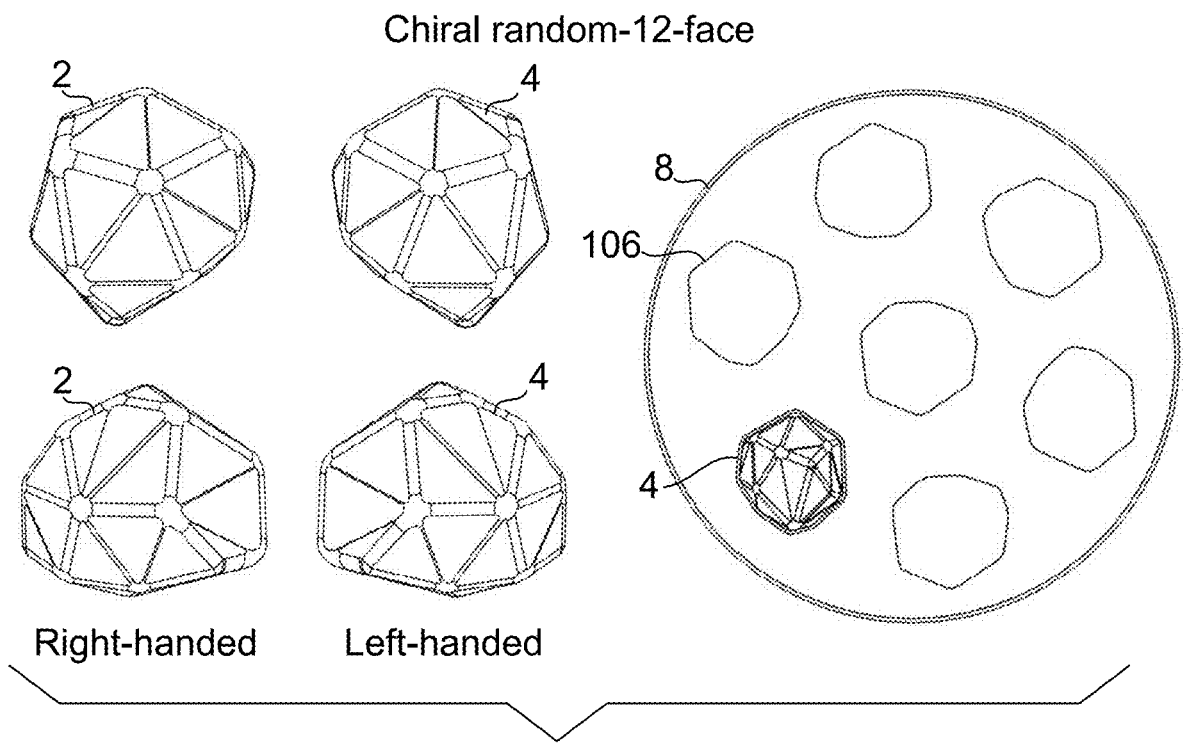
Figure 8:
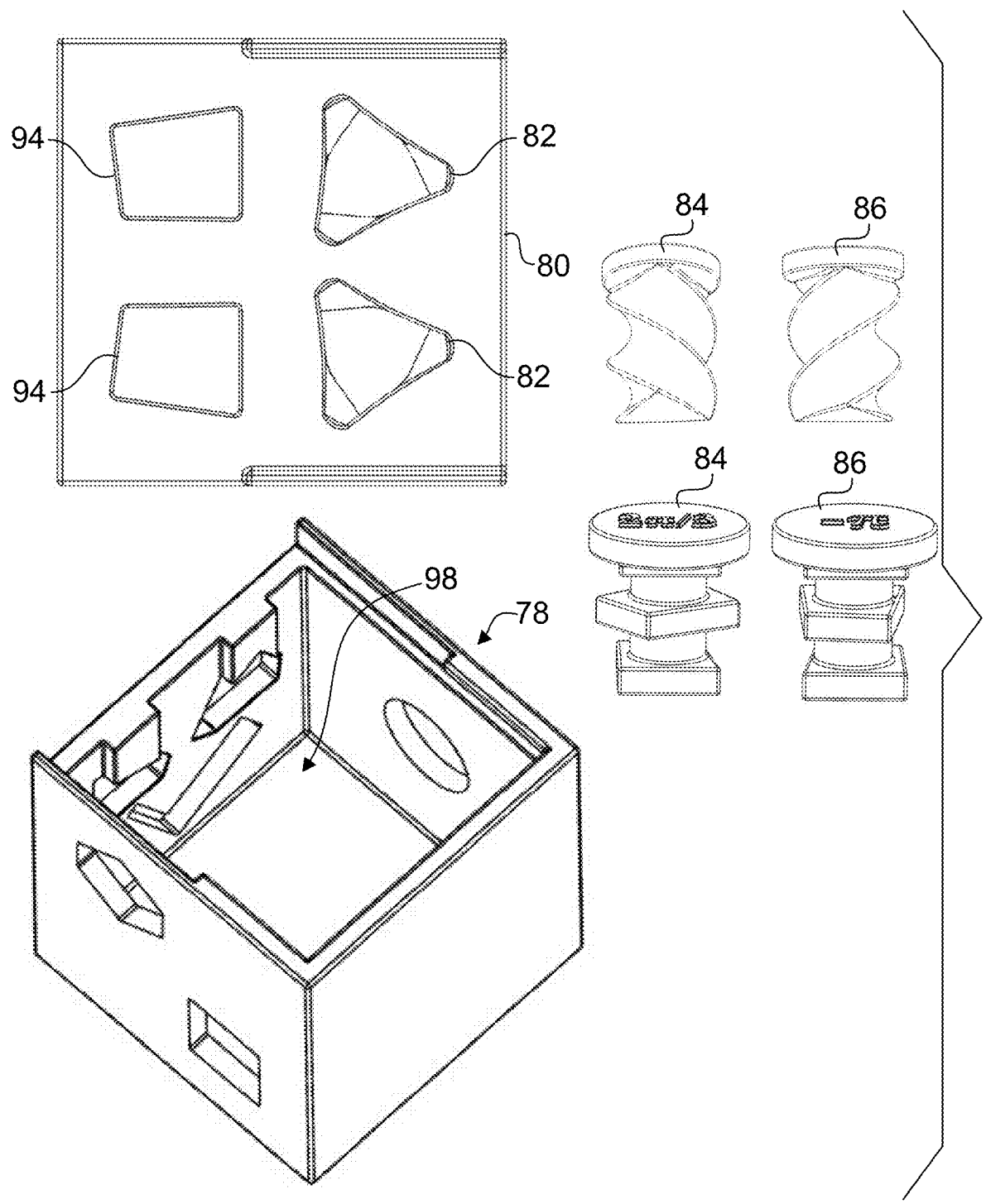
Figure 8A:
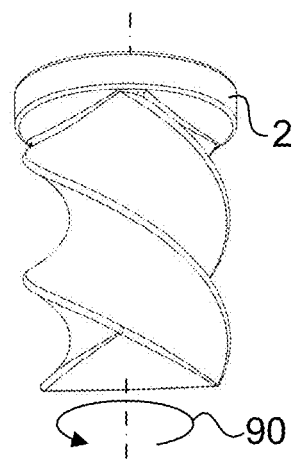
Figure 8B:
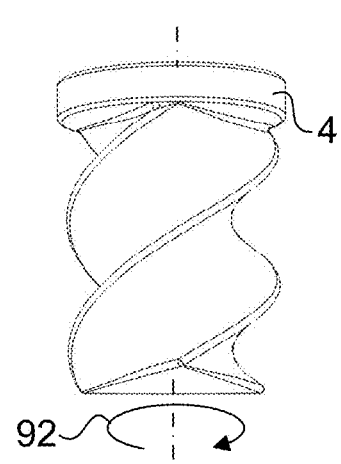
Figure 8C:
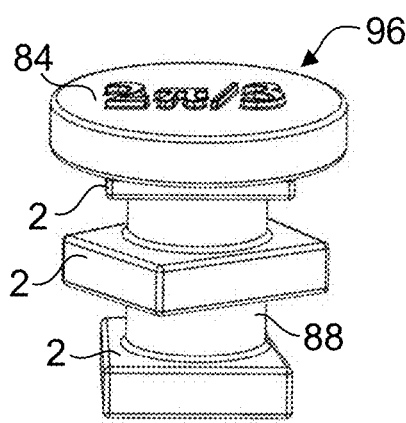
Figure 8D:
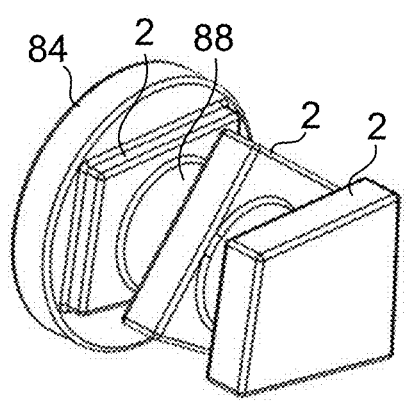
Figure 8E:
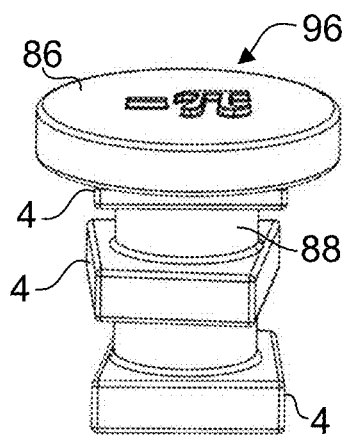
Figure 8F:
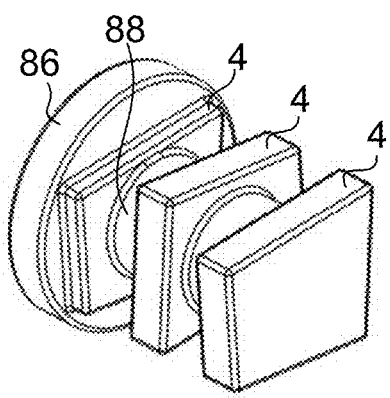
Figure 9A:
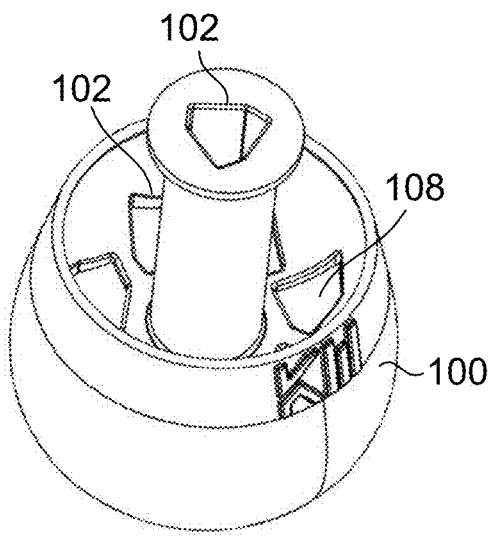
Figure 9B:
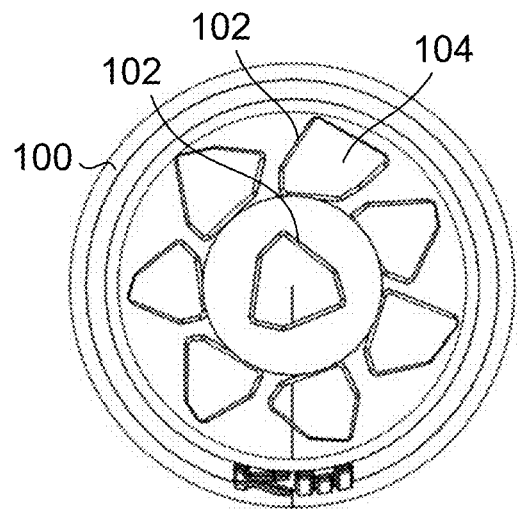
Figure 9C:
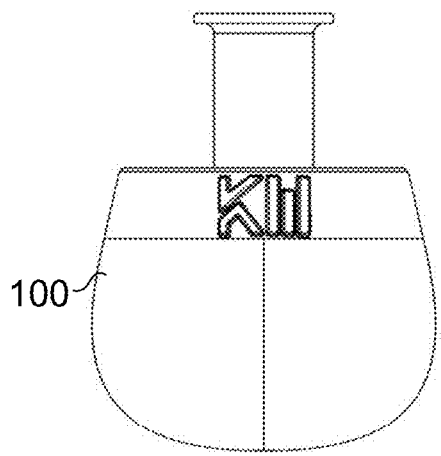
Figure 10A:
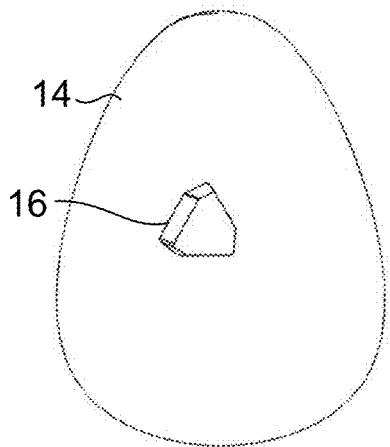
Figure 10B:
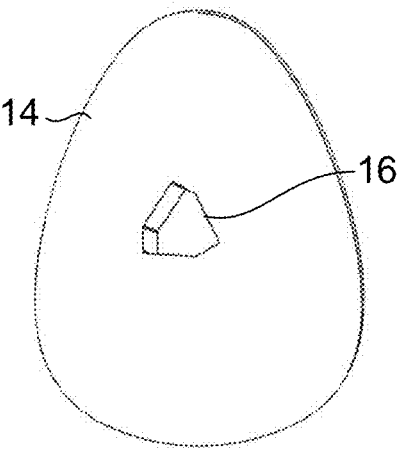

Each of FIGS. 2B and 2C is a top perspective cross-sectional view of a first enclosed channel of the chiral separation apparatus of FIG. 1, depicting surfaces complementary to surfaces of the chiral object at the bend of the first enclosed channel for the chiral separation apparatus;

FIG. 3 is a side cross-sectional view of a second enclosed channel of the chiral separation apparatus of FIG. 1;

FIG. 3A is a top perspective view of a second enclosed channel of the chiral separation apparatus of FIG. 1, depicting surfaces complementary to surfaces of the enantiomorph of the chiral object at the bend of the second enclosed channel for the chiral separation apparatus;

Each of FIGS. 3B and 3C is a top perspective cross-sectional view of a second enclosed channel of the chiral separation apparatus of FIG. 1, depicting surfaces complementary to surfaces of the enantiomorph to the chiral object at the bend of the second enclosed channel for the chiral separation apparatus;

FIG. 3D is diagram depicting a chiral separation apparatus, e.g., for a right-handed chiral tetrahedron, as viewed from various angles;

FIG. 3E is diagram depicting a chiral separation apparatus, e.g., for a left-handed chiral tetrahedron, as viewed from various angles;

FIG. 3F is diagram depicting a chiral separation apparatus, e.g., for a right-handed chiral cube, as viewed from various angles;

FIG. 3G is diagram depicting a chiral separation apparatus, e.g., for a left-handed chiral cube, as viewed from various angles;

FIG. 4 is a top perspective view of a spontaneous separation apparatus, depicting a first opening of the spontaneous separation apparatus;

FIG. 5 is a top perspective view of a spontaneous separation apparatus, depicting a second opening of the spontaneous separation apparatus;

FIG. 5A is a top view of a spontaneous separation apparatus, depicting a second opening of the spontaneous separation apparatus useful for blocking an enantiomorph;

FIG. 6 is a diagram depicting a cross-sectional view of a combined spontaneous separation apparatus useful for separating the two enantiomorphs of a chiral object;

FIG. 6A is a diagram depicting a cross-sectional view of a combined spontaneous separation apparatus useful for separating a chiral object and its enantiomorph where the chiral object is being separated from its enantiomorph with the aid of gravity;

FIG. 6B is a diagram depicting a cross-sectional view of a combined spontaneous separation apparatus useful for separating a chiral object and its enantiomorph where an enantiomorph of a chiral object is being resolved with the aid of a user;

FIG. 7A-7F is a series of diagrams depicting some examples of the enantiomorphs of various chiral objects and their respective spontaneous separation apparatuses;

FIG. 7A is a diagram depicting a pair of enantiomorphs of a chiral dodecahedron which includes twelve identical faces with each face being an irregular pentagon;

FIG. 7B is a diagram depicting a pair of enantiomorphs of a chiral tetrahedron cage which includes six identical rectangular strips twisted and bent and joined at four corners of a tetrahedron;

FIG. 7C is a diagram depicting a pair of enantiomorphs of a chiral cube which includes six identical faces with each face made of a tetragon with four different lengths;

FIG. 7D is a diagram depicting a pair of enantiomorphs of a chiral 10-face solid which includes ten identical faces with each face made of a tetragon with four different lengths;

FIG. 7E is a diagram depicting a pair of enantiomorphs of a snub tetrahedron which is chiral and is geometric dual of chiral dodecahedron. It includes twenty faces each having two sets of equilateral triangles and twelve scalene triangles;

FIG. 7F is a diagram depicting a pair of enantiomorphs of a chiral random 12-faces which includes twelve different irregular pentagons. This chiral solid shape is modified from chiral dodecahedron;

FIG. 8 is a diagram depicting a toy including a plurality of separation apparatuses useful for separating chiral objects from their enantiomorphs;

FIG. 8A is a bottom perspective view of a chiral object;

FIG. 8B is a bottom perspective view of a chiral object which is an enantiomorph of the chiral object shown in FIG. 8A;

FIG. 8C is a top perspective view of a chiral object-based toy piece;

FIG. 8D is a bottom perspective view of the chiral object-based toy piece shown in FIG. 8C;

FIG. 8E is a top perspective view of an enantiomorph of the chiral object shown in FIGS. 8C and 8D;

FIG. 8F is a bottom perspective view of an enantiomorph of the chiral object of FIG. 8E;

FIGS. 9A-9C are diagrams depicting a toy including a separation apparatus useful for separating a chiral object from its enantiomorph with FIG. 9A being a top perspective view, FIG. 9B being a top view and FIG. 9C being a side view of the separation apparatus, respectively;

FIG. 10A is a side view of a toy including a separation apparatus useful for separating a chiral object from its enantiomorph; and FIG. 10B is a side view of a toy including a separation apparatus useful for separating a chiral object from its enantiomorph.

PARTS LIST

2—chiral object or solid
4—enantiomorph of chiral object 2
6—chiral separation apparatus
8—spontaneous separation apparatus
10—first opening of chiral separation apparatus
12—second opening of chiral separation apparatus
14—toy
16—opening
18—block
20—first enclosed channel of chiral separation apparatus
22—second enclosed channel of chiral separation apparatus
24—first surface
26—second surface
28—first portion of first enclosed channel
30—second portion of first enclosed channel
32—first portion of second enclosed channel
34—second portion of second enclosed channel
36—first shape of first opening
38—second shape of second opening
40—first projection of chiral object
42—second projection of chiral object
44—third shape of third opening
46—fourth shape of fourth opening
48—fifth projection of enantiomorph of chiral object
50—sixth projection of enantiomorph of chiral object
52—third opening of enantiomorph
54—fourth opening of enantiomorph
56—first surface
58—second surface
60—funnel wall
62—first opening of spontaneous separation apparatus
64—second opening of spontaneous separation apparatus
66—first projection of chiral object of spontaneous separation apparatus
68—second projection of enantiomorph of spontaneous separation apparatus
70—chiral object
72—enantiomorph of chiral object 70
74—pointy end of chiral object
76—angle between first surface and second surface
78—box
80—removable lid
82—opening
84—toy piece with chiral object
86—toy piece with enantiomorph of chiral object
88—stem
90—direction
92—direction
94—opening
96—cap or handle
98—interior space
100—toy
102—opening
104—interior space
106—opening or hole

PARTICULAR ADVANTAGES OF THE INVENTION

The present chiral and spontaneous separation apparatuses are each capable of separating a chiral object from its enantiomorph, making them suitable for use as separators for chiral objects that must be separated from their respective enantiomorphs. If many enantiomorphs, both left-handed and right-handed, occur together physically, the only practical way to separate them all at one time instead of one by one may be to use the present chiral and/or spontaneous separation apparatuses.

When used as a toy or a teaching tool, the present chiral and spontaneous separation apparatuses are more engaging and thought-provoking and provide more knowledge and basic as well as advanced learning experiences when compared to prior art shape sorters.

DETAILED DESCRIPTION OF A PREFERRED EMBODIMENT

The term "about" is used herein to mean approximately, roughly, around, or in the region of. When the term "about"

is used in conjunction with a numerical range, it modifies that range by extending the boundaries above and below the numerical values set forth. In general, the term "about" is used herein to modify a numerical value above and below the stated value by a variance of 20 percent up or down (higher or lower).

Figure 1A:
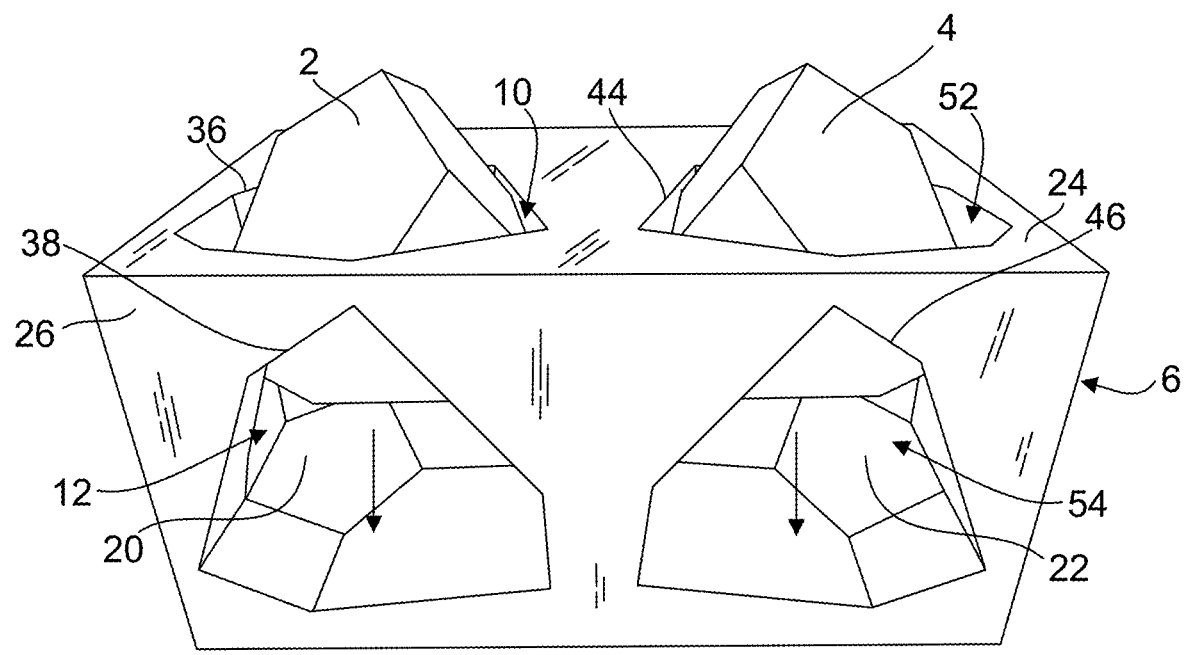
FIG. 1A-1D is a series of diagrams depicting various stages of the pairs of enantiomorphs of chiral objects of FIG. 1 as they are disposed through their respective enclosed channels of the chiral separation apparatus of FIG. 1.
Figure 1B:
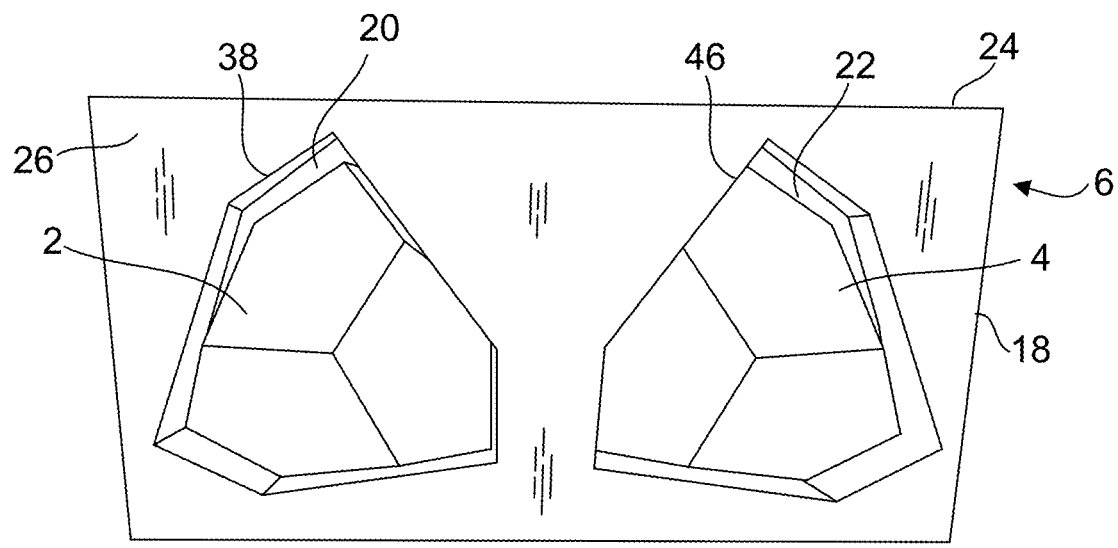
Figure 1C:
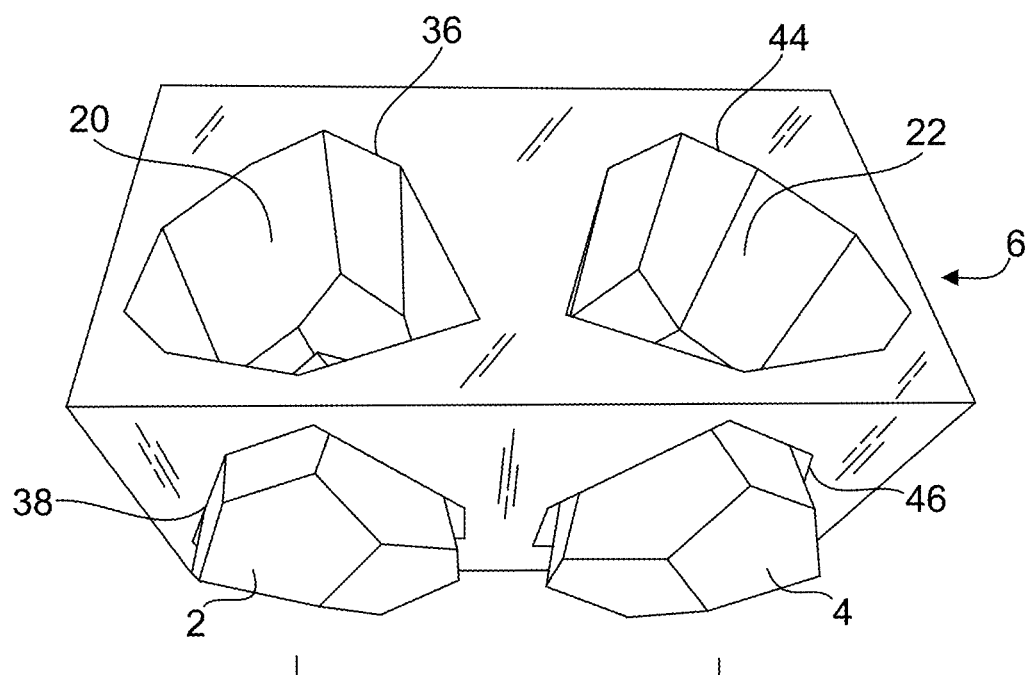
Figure 1D:
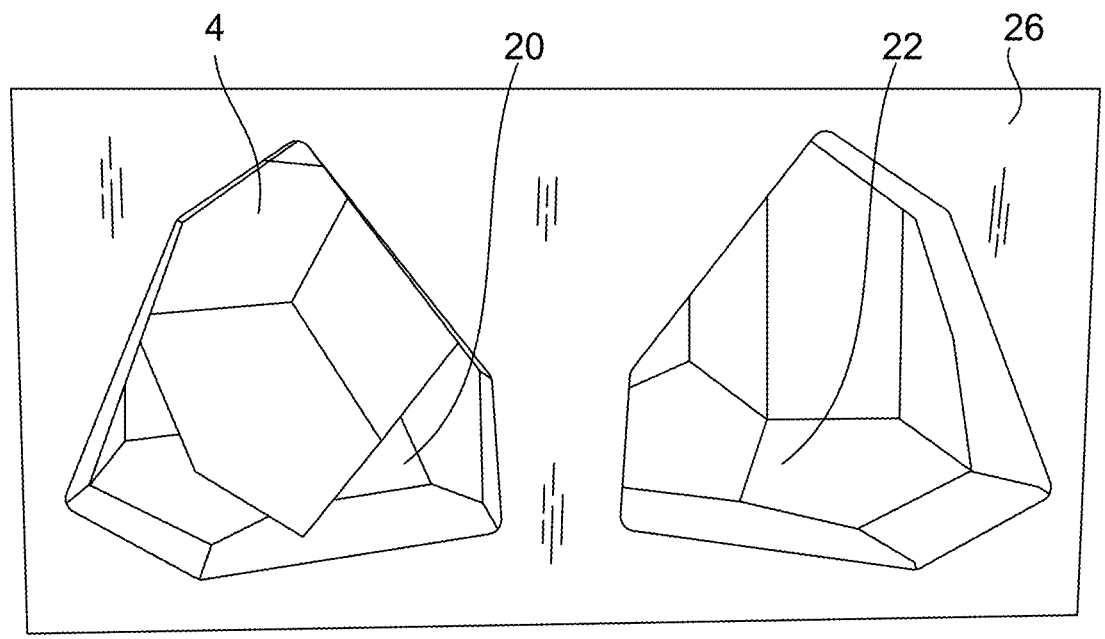

FIG. 1 is a top front perspective view of a chiral separation apparatus, depicting a pair of enclosed channels each for separating a chiral object 2 from its enantiomorph 4. FIGS. 1A-1D is a series of diagrams depicting various stages of the chiral object and its enantiomorph of FIG. 1 as they are disposed through their respective enclosed channels of the chiral separation apparatus of FIG. 1. FIG. 2 is a side cross-sectional view of a first enclosed channel of the chiral separation apparatus of FIG. 1 showing the surface details of the first enclosed channel 20. The separation apparatus 6 is configured for separating a chiral object from an enantiomorph 4 of the chiral object. It shall be noted that the chiral object 2 and its enantiomorph 4 are so referenced for convenience in describing the manner in which one is related to the other. From another perspective, the enantiomorph 4 may be identified as a chiral object having an enantiomorph that is referenced as the item currently identified as the chiral object. The apparatus 6 is essentially an elongated block 18 having two enclosed channels 20, 22 disposed side-by-side along the length of the block although each enclosed channel can be disposed in any object having at least two surfaces disposed on two different planes. The two enclosed channels 20, 22 need not be disposed on the same elongated block. However, when they are disposed next to one another, a user has the benefit of comparing and contrasting the two enclosed channels 20, 22 side-by-side while deciphering the solution of each enclosed channel. Each enclosed channel 20, 22 includes a first opening 10 and a second opening 12. The first opening 10, disposed on a first surface 24, includes a first shape 36 characterized by a first projection 40 of the chiral object disposed in a first orientation. The second opening 12, disposed on a second surface 26, includes a second shape 38 characterized by a second projection 42 of the chiral object disposed in a second orientation. The first shape extends from the first opening 10 through a first portion of the first enclosed channel 20 and the second shape extends from the second opening 12 through a second portion 30 of the first enclosed channel 20 to coincide with the first portion 28 of the first enclosed channel 20 to form an intersection having a surface complementary to the chiral object 2 disposed in the first orientation with respect to the first opening 10 and the second orientation with respect to the second opening 12. When the chiral object is disposed in the first orientation, the chiral object includes a third projection matching the first shape and a fourth projection matching the second shape, the chiral object can be disposed through the first opening, the first enclosed channel 20 to exit the first enclosed channel 20 through the second opening 12. Likewise, the chiral object can be disposed through the second opening 12 through the first enclosed channel 20 to exit the first enclosed channel 20 through the first opening 10. The chiral object 2 is said to be separable from an enantiomorph 4 of the chiral object via at least one of the first opening 10 and the second opening 12. As the enantiomorph 4 cannot fit through the first enclosed channel 20 in its entirety, the chiral object 2 can be separated from the enantiomorph 4 if desired. Therefore, it shall be noted that a chiral object 2 can pass through the first enclosed channel or channel from both directions, i.e., from first opening to second opening, and vice versa. However, its enantiomorph 4 will not be able to pass through the enclosed channel connecting the two openings from either direction. Its enantiomorph 4 can have a cross-sectional projection that fits one portion of the first enclosed channel 20 as shown in FIG. 1D but unable to pass through the first portion of enclosed channel 20 in its entirety. However, due to the lack of surfaces complementary to the enantiomorph 4 at the bend of the first enclosed channel 20, its enantiomorph 4 is unable to be resolved using the first enclosed channel 20. By the same token, the enantiomorph 4 of the chiral object can pass through the second enclosed channel or channel from both directions, i.e., from third opening to fourth opening, and vice versa. However, the chiral object 2 will not be able to pass through the second enclosed channel connecting the third opening and fourth opening from either direction as second enclosed channel 22 lacks surfaces complementary to the bend at the second enclosed channel 22. Therefore, it shall be noted that both enantiomorphs can go through the same orthogonal projection of either portion of an enclosed channel. However, at the bend of the enclosed channel, the complementary surfaces of one of the enantiomorph will allow that enantiomorph to pass through but block the other one. In one embodiment, each of the first opening 10 and the second opening 12 is asymmetrical about its respective central axis. In one embodiment, a chiral separation is performed manually. In other words, in an attempt to separate a chiral object and its enantiomorph, the chiral object or its enantiomorph is manually positioned, orientated and attempted with each of the enclosed channels. It shall be is noted that for a chiral separation apparatus, the shape of the opening which allows an object to enter an enclosed channel is different from the shape of the opening which allows the object to exit the enclosed channel. Referring to FIG. 1A, once orientated in a manner to match their respective openings, the chiral object 2 and its enantiomorph 4 are inserted through their respective openings 10, 52 into the chiral separation apparatus 6 until they arrive at the respective intersections of the first portion and second portion of the respective enclosed channels 20, 22 as shown in FIG. 1B. It shall be noted that the chiral object 2 and its enantiomorph 4 both conform to their respective enclosed channels 20, 22. FIG. 2A is a top perspective view of a first enclosed channel of the chiral separation apparatus of FIG. 1, depicting surfaces complementary to surfaces of the chiral object at the bend of the first enclosed channel for the chiral separation apparatus. Each of FIGS. 2B and 2C is a top perspective cross-sectional view of a first enclosed channel of the chiral separation apparatus of FIG. 1, depicting surfaces complementary to surfaces of the chiral object 2, e.g., a right-handed chiral dodecahedron, at the bend of the first enclosed channel for the chiral separation apparatus. It shall be noted in FIG. 2B that the shape of surfaces of the intersection of the first portion 28 of the first enclosed channel and the second portion 30 of the first enclosed channel conforms to the bottom surfaces of the chiral object 2. A chiral dodecahedron is made of 12 faces of identical irregular pentagonal faces. The handedness is assigned arbitrarily.

FIG. 3 is a side cross-sectional view of a second enclosed channel of the chiral separation apparatus of FIG. 1 without showing the surface details of the second enclosed channel 22 for simplicity. Here, the separation apparatus further includes a second enclosed channel 22 including a third opening 52 and a fourth opening 54, wherein the third opening 52 includes a third shape 44 characterized by a first projection of the enantiomorph 4 of the chiral object disposed in a third orientation and the fourth opening 54 includes a fourth shape 46 characterized by a second projection of the enantiomorph 4 of the chiral object disposed in a fourth orientation. The third shape extends from the third opening 52 through a first portion 32 of the second enclosed channel 22 and the fourth shape extends from the fourth opening 64 through a second portion 34 of the second enclosed channel 22 to coincide with the first portion 32 of the second enclosed channel 22. When the enantiomorph 4 of the chiral object is disposed in the third orientation, the enantiomorph 4 of the chiral object includes a fifth projection 48 matching the third shape and a sixth projection 50 matching the fourth shape. The enantiomorph 4 can be disposed through the third opening 52, the second enclosed channel 22 to exit the second enclosed channel 22 through the fourth opening 54. Likewise, the enantiomorph 4 can be disposed through the fourth opening 54 through the second enclosed channel 22 to exit the second enclosed channel 22 through the third opening 52. The enantiomorph 4 is said to be separable from the chiral object 2 via at least one of the third opening 52 and the fourth opening 54. When used as a separation apparatus to separate a chiral object 2 from its enantiomorph 4, the enclosed channels 20, 22 are not to be used to connect a common space accessible from the two openings of each enclosed channel, but rather separated according to the products to be gathered in specific spaces. Each portion of an enclosed channel is shown as a rectilinear enclosed channel although it is conceivable that this enclosed channel is non-rectilinear. Also, the length of each portion can be disposed at a desired length without affecting the ability of the separation apparatus for separating a chiral object 2 from its enantiomorph 4.

FIG. 3A is a top perspective view of a second enclosed channel of the chiral separation apparatus of FIG. 1, depicting surfaces complementary to surfaces of the chiral object at the bend of the second enclosed channel for the chiral separation apparatus. Each of FIGS. 3B and 3C is a top perspective cross-sectional view of a second enclosed channel of the chiral separation apparatus of FIG. 1, depicting surfaces complementary to surfaces of the enantiomorph 4 of the chiral object, e.g., a left-handed chiral dodecahedron, at the bend of the second enclosed channel for the chiral separation apparatus. It shall be noted in FIG. 3B that the shape of surfaces of the intersection of the first portion 32 of the second enclosed channel and the second portion 34 of the second enclosed channel conforms to the bottom surfaces of the enantiomorph 4 of the chiral object. Again, the handedness is assigned arbitrarily. Again, it shall be noted in FIG. 3B that the shape of surfaces of the intersection of the first portion 32 of the second enclosed channel and the second portion 34 of the first enclosed channel conforms to the bottom surfaces of the chiral object 2.

In the embodiment shown in FIGS. 1-3, the third orientation and the fourth orientation are disposed at a right angle to one another. As a sorter toy, such configuration reduces the complexity of the sorter toy as the orientation of the chiral object is not required to be altered as it negotiates the first enclosed channel 20. In one embodiment, the third opening 52 includes an area and the area of the first projection of the enantiomorph 4 of the chiral object is smaller than the first area by about 1-5% of the area of the third opening 52. With this difference in the cross-sectional areas, only an object with a matching cross-sectional shape, i.e., a shape with an area just under the opening size can be disposed through the second enclosed channel 22. The difference is not too large as to allow an object with a non-matching cross-sectional shape to fit through simply only due to its size. Therefore, the openings shall be small enough to increase the fidelity of distinguishing between the chiral object 2 and its enantiomorph 4. In one embodiment, the first orientation and the second orientation are also disposed at a right angle to one another to keep the challenges of using the present separation apparatus to a level suitable for its users. Although a right angle or a 90-degree angle is used, a bend of up to about 120 degrees may be used to still sufficiently maintain the two projections, e.g., one for the first opening and the other for the second opening that are disposed at substantially at a right angle. At the bend, the surfaces of the first enclosed channel are substantially surfaces that mold to the shape of the chiral object. On each end of the bend, the enclosed channel assumes a portion of an enclosed channel having one of the two different cross-sectional shapes that matches orthogonal projections of the chiral object. As the surfaces at the bend match the surfaces of one chiral shape, the enantiomorph of the chiral object will not pass through the first enclosed channel. In one embodiment, the first opening includes an area and the area of the first orthogonal projection of the chiral object is smaller than the area by about 1-5% of the area of the first opening. Again, this difference in size allows an object with the suitable cross-sectional profile to fit through the first enclosed channel and prevents an object without a suitable cross-sectional profile to pass through. In one embodiment, the chiral object can be C1-symmetric solids, chiral tetrahedron, chiral cube, chiral dodecahedron, e.g., tetragonal pentagonal dodecahedron and its geometric dual called snub tetrahedron, pentagonal icositetrahedron and its geometric dual called snub cube, pentagonal hexecontahedron and its geometric dual called snub dodecahedron, or any other solid shapes exhibiting one of the symmetry elements or characterizations of C1, Cn, Dn, T, O and I as described elsewhere herein.

In one embodiment not shown, the separation apparatus and one or more chiral objects and one or more enantiomorphs of the one or more chiral objects are configured as computer models where any one of the models is digitally manipulatable by its orientation and position with respect to one another such that the same attempts for separating each object can be carried out on a computer using a computer program. A projection referenced elsewhere herein is an orthogonal projection of an outline of an object upon a surface on which an opening is disposed.

Disclosed herein is also a process for producing a chiral separation apparatus for allowing a chiral object to traverse from a first surface to a second surface via an enclosed channel. The process includes first selecting an orientation of the chiral object that gives one of the smallest orthogonal projections. The area of the projection should be smaller than the largest area of projection possible with the chiral object. This is followed by projecting the chiral object disposed in a first orientation with respect to a first surface, e.g., of a block, in a first projection and negating a volume of the block encompassed by a first portion of an enclosed channel traced by a total area characterized by an area of the first projection of the chiral object and an area of a tolerance around the first projection of the chiral object in a general direction from the first surface to an appropriate depth. While still disposed in the first orientation with respect to the first surface, the chiral object is projected against a second surface of the block in a second projection, where the second surface is disposed at a right angle with respect to the first surface. Another volume of the block is further negated along a second portion of the enclosed channel encompassed by tracing a total area characterized by an area of the second projection of the chiral object and an area of a tolerance around the second projection of the chiral object in a general direction from the second surface of the first surface to an appropriate depth sufficient to intersect the enclosed channel of the first projection. If the separation apparatus and one or more chiral objects and one or more enantiomorphs of the one or more chiral objects are configured as computer models, e.g., solid models, the negating step is carried out electronically, e.g., by removing materials from the solid models of the separation apparatuses.

FIGS. 3D-3G depicts additional examples of chiral apparatuses. FIG. 3D is diagram depicting a chiral separation apparatus, e.g., for a right-handed chiral tetrahedron, as viewed from various angles. FIG. 3E is diagram depicting a chiral separation apparatus, e.g., for a left-handed chiral tetrahedron, as viewed from various angles. The bottom two views are cross-sectional views revealing complementary surfaces at the bend for an enclosed channel through which a suitable enantiomorph can pass through, with one of them showing the suitable enantiomorph disposed therein. A chiral tetrahedron is made of four faces of identical scalene triangles. Referring to both FIGS. 3D and 3E, the handedness is assigned arbitrarily.

FIG. 3F is diagram depicting a chiral separation apparatus, e.g., for a right-handed chiral cube, as viewed from various angles. FIG. 3G is diagram depicting a chiral separation apparatus, e.g., for a left-handed chiral cube, as viewed from various angles. The bottom two views are cross-sectional views revealing complementary surfaces at the bend for an enclosed channel through which a suitable enantiomorph can pass through, with one of them showing the suitable enantiomorph disposed therein. A chiral cube is made of six faces of identical irregular trapezoids. Again, referring to both FIGS. 3F and 3G, the handedness is assigned arbitrarily.

FIG. 4 is a top perspective view of a spontaneous separation apparatus, depicting a first opening 62 of the spontaneous separation apparatus 8. FIG. 5 is a top perspective view of a spontaneous separation apparatus 8, depicting a second opening 64 of the spontaneous separation apparatus. The separation apparatus 8 includes a first opening 62 and a second opening 64. The first opening 62 includes a first shape characterized by a first projection 66 of the chiral object disposed in a first orientation and the second opening includes a second shape characterized by a second projection 68 of an enantiomorph of the chiral object. When the chiral object 70 is disposed in the first orientation, the chiral object 70 includes a third projection matching the first shape and can therefore pass through the first opening 62 while the enantiomorph is naturally stopped by the first opening. The first opening 62 is disposed on a first surface 56. In the embodiment shown, a funnel wall 60 is disposed around the first surface 56 such that the chiral object 70 can naturally find the first opening with the aid of gravity in an orientation to pass through the first opening 62 once it is dropped onto the first surface 56, by free falling onto the first surface 56. Here, the enclosed channel leading from the first opening 62 is not chiral. In this example, the chiral object is a tetragonal pentagonal dodecahedron. Once dropped onto the first surface 56 bounded by the funnel wall 60, the chiral object 70 tends to be disposed in an orientation where its cross-sectional area matches that of the first opening 62 as the pointy end 74 of the chiral object tends to seek a lower point due to the weight distribution of the chiral object and the pointy end 74 tends to be lodged in the first opening 62 while its cross-sectional profile matches the first opening 62. For object 70 to be chiral, the back end is often asymmetric. The first opening 62 is created with the asymmetric shape of the back end of the chiral object 70. As the back end of the enantiomorph 72 gets into the first opening 62, the shape of the first opening 62 prevents the enantiomorph 72 from passing through. The chiral object 70 is said to be separable from the enantiomorph 72 of the chiral object 70 via the first opening 62. Likewise, for the second opening 64, when the enantiomorph 72 is disposed in an orientation producing a projection matching the second shape, the enantiomorph can therefore pass through the second opening 64 while the chiral object 70 is naturally stopped by the second opening. The second opening 64 is disposed on a second surface 58. The first opening 62 and second opening 64 shall be sufficiently large, i.e., the difference between an orthogonal projection of a chiral object or its enantiomorph and each of the openings shall be about 1-5% of the area of one of the openings to facilitate a high probability of the chiral object or its enantiomorph falling through its respective opening. The openings shall be small enough to increase the fidelity of distinguishing between the chiral object and its enantiomorph. In the embodiment shown, again, a funnel wall 60 is disposed around the second surface 58 such that the enantiomorph 72 can naturally find the second opening with the aid of gravity in an orientation to pass through the second opening once it is dropped onto the second surface 58 while a chiral object 70 will be stopped. It shall be noted that each opening 62, 64 is asymmetric about an axis normal to either one of the first surface and second surface. As the effectiveness of spontaneous separation using the present spontaneous separation apparatus depends on gravity and the shape of the chiral object and not every chiral solid can be efficiently separated by spontaneous separation, the chiral separation apparatus shown elsewhere herein is useful for separating all chiral objects having one or more chiral features expressed on one or more external surfaces of the chiral objects, i.e., "exposed" chiral features. It shall be noted that a chiral separation apparatus is also not useful for separating a chiral object from its enantiomorph if the chiral object has a chiral feature that does not extend beyond the general periphery of the chiral object, e.g., a sphere having a chiral feature disposed within the surface of the sphere. In other words, the chiral feature is not exposed to allow a complementary shape of a chiral separation apparatus to act on this chiral feature. FIG. 5A is a top view of a spontaneous separation apparatus, depicting a second opening 64 of the spontaneous separation apparatus useful for blocking an enantiomorph 70 while passing an enantiomorph 72 as shown in FIG. 5.

FIG. 6 is a diagram depicting a cross-sectional view of a combined spontaneous separation apparatus useful for separating a chiral object and its enantiomorph in two different ways. FIG. 6A is a diagram depicting a cross-sectional view of a combined spontaneous separation apparatus useful for separating a chiral object and its enantiomorph where the chiral object is being separated from its enantiomorph with the aid of gravity. Here, the first opening 62 and the second opening 64 are opposingly disposed from one another and the first opening 62 and the second opening 64 are the same opening. As the two openings are one and the same and distinguishable only from the perspective from which an opening is viewed, it reinforces the concept of chirality for the user as an enantiomorph can be viewed as a mirrored object to a chiral object. The enclosed channel which connects the two openings is therefore straight and has no internal features. Although not shown, the openings may also be connected using a curved enclosed channel provided that the necessary cross-sectional profiles of the openings have been maintained through the enclosed channel. It shall be noted, as shown in FIG. 6, surface 56 is disposed above surface 58. While disposed in this orientation, the apparatus allows the chiral object 70 to pass through the first opening 62 with the aid of gravity, i.e., once dropped into the space bounded by the funnel wall 60 surrounding surface 56 as shown in FIG. 6A, the pointy end 74 of the chiral object 70 is automatically orientated, in such a way under the influence of gravity, to contact the first opening 62 and passes through it without needing other external aids. For separating the enantiomorph 72 from the chiral object 70, the apparatus is flipped such that surface 58 faces upwardly and surface 56 downwardly. The enantiomorph can be dropped into the space bounded by the funnel wall 60 surrounding surface 58, the pointy end of the enantiomorph 72 is automatically orientated, in such a way under the influence of gravity, to contact the second opening 64 and passes through it without needing other external aids. As long as the chiral object 70 or its enantiomorph 72 is dropped at sufficient height into their respective spaces, there is a high probability that bounces of the chiral object 70 or its enantiomorph 72 with their respective spaces will cause them to automatically drop into and through their respective openings.

FIG. 6B is a diagram depicting a cross-sectional view of a combined spontaneous separation apparatus useful for separating a chiral object and its enantiomorph where an enantiomorph of a chiral object is being resolved with the aid of a user. It shall be noted that the apparatus is orientated in a manner similar to the orientation of the apparatus in FIGS. 6 and 6A. In spontaneous separation, the enantiomorph 72 is capable to be resolved as well, albeit at a much lower probability by gravity. FIG. 6B depicts a manner in which an enantiomorph can be resolved when it is orientated in a manner shown manually. Therefore, it shall be noted that in spontaneous separation, both enantiomorphs of the chiral object can be resolved by free falling through the same apparatus but from opposite end of the opening, e.g., one enantiomorph fall through the hole, the other one is blocked. When the apparatus is flipped upside down, the previously blocked enantiomorph will fall through, and the previously falling through enantiomorph will be blocked.

In one embodiment, the chiral object can be of any of the six classes of chiral symmetries, i.e., C1, Cn, Dn, T, D, I, examples of which include all of those disclosed elsewhere herein. C1 symmetry chiral objects include a polyhedron with all different surfaces, a shape with three unequal protrusions positioned so that the shape has no reflection plane of symmetry. Cn symmetry chiral objects include a shape with three equal protrusions positioned so that the shape has no reflection plane of symmetry, e.g., a C3 symmetry, where n=2,3,4 . . . Dn symmetry chiral objects include a scalene tetrahedron, a chiral tetrahedron, e.g., a D2 symmetry, a trapezohedron with asymmetric sides and a chiral cube, e.g., a D3 symmetry. In one example, a T symmetry chiral object is a tetragonal pentagonal dodecahedron. O symmetry chiral objects include a pentagonal icositetrahedron and a Snub cube. I symmetry chiral objects include a pentagonal hexecontahedron and a Snub dodecahedron. Both chiral and spontaneous separation apparatuses have now been disclosed. It shall be noted that in a spontaneous separation apparatus, both enantiomorphs of a chiral object can be separated from the other one by the same apparatus through free falling caused by gravity. One orientation of the apparatus will block the left-handed enantiomorph, but let the right-handed enantiomorph to pass through, left and right-handedness arbitrarily assigned. When the apparatus is flipped upside down, the right-handed enantiomorph will be blocked, and the left-handed enantiomorph will pass through. Contrast this with a chiral separation apparatus where only one of the two enantiomorphs, e.g., the left-handed one, can pass through a channel and be separated, the right-handed one will be blocked at the turn or bend of the enclosed channel. When the entire channel for the left-handed enantiomorph is constructed as its mirror image, this mirror image-channel will block the left-handed enantiomorph and let the right-handed one pass through.

FIG. 7A-7F is a series of diagrams depicting some examples of spontaneous separation apparatuses, chiral objects and their respective enantiomorphs and holes 106 created using asymmetric two-dimensional orthogonal projections for their spontaneous separations assisted by gravity and user-manipulated separations. The holes 106 function in a similar manner as the openings 62, 64 found in FIGS. 4 and 5. The chiral objects include chiral dodecahedron as shown in FIG. 7A, chiral tetrahedron cage as shown in FIG. 7B, chiral cube as shown in FIG. 7C, chiral-10-face solid as shown in FIG. 7D, snub-tetrahedron as shown in FIG. 7E, chiral random 12-faces as shown in FIG. 7F. For an enantiomorph to pass through, a selected projection of the enantiomorph is made into a hole. The projection is chosen to be small but sufficient to fit the enantiomorph and asymmetric in shape. FIG. 7B depicts chiral tetrahedron-cages with left and right-handedness arbitrarily assigned and openings for separating them assisted by gravity. FIG. 7C depicts chiral cubes with left and right-handedness arbitrarily assigned and the openings for separating them assisted by gravity. FIG. 7D depicts chiral 10-face solids with left and right-handedness arbitrarily assigned and the openings for separating them assisted by gravity. FIG. 7E depicts snub tetrahedrons with left and right-handedness arbitrarily assigned and the openings for separating them assisted by gravity. FIG. 7F depicts chiral random-12-faces with left and right-handedness arbitrarily assigned and the openings for separating them assisted by gravity.

It shall also be noted that methods of separating chiral molecules, such as those in the drug development industry, the effectiveness of separation is often not 100%, implying that the result consists of a high percentage of one handedness molecules and a low percentage of the other handedness molecules. In the case of chiral separation, the effectiveness is 100%, implying that only left-handed enantiomorph can pass left-handed channel, all the right-handed enantiomorph will be blocked, and vise versa. For the spontaneous separation that is driven by free falling, the effectiveness may not be 100%. However, for chiral dodecahedron, e.g., as shown in FIG. 6, the spontaneous separation has achieved more than 99.9% effectiveness, i.e., no "wrong" enantiomorphs pass through the opening within 100 trials. For other chiral object examples shown in FIG. 7, the effectiveness is greater than at least 50%.

FIG. 8 is a diagram depicting a toy including a plurality of separation apparatuses useful for separating chiral objects from their enantiomorphs. Here, a toy including a box 78 with a removeable lid 80 and toy pieces 84, 86 are provided. As there are a plurality of separation apparatuses requiring different strategies to solve, a user of the toy is presented with more challenging puzzles which must be solved with more thoughts and trials. The lid 80 includes two sets of separation apparatuses. In general, these separation apparatuses require the user to incorporate rotations to the toy pieces 84, 86 in order to be able to solve the puzzles, i.e., to seat the toy pieces in their respective openings. FIG. 8A is a bottom perspective view of a chiral object. FIG. 8B is a bottom perspective view of a chiral object which is an enantiomorph of the chiral object shown in FIG. 8A. Here, upon determining the suitable object for an appropriate opening 82, the user must twist the toy piece 84, 86 in direction 90 or 92, respectively, in order to advance the toy piece 84, 86 to be eventually seated in the appropriate opening 82. FIG. 8C is a top perspective view of a chiral object-based toy piece. FIG. 8D is a bottom perspective view of the chiral object-based toy piece shown in FIG. 8C. FIG. 8E is a top perspective view of an enantiomorph of the chiral object shown in FIGS. 8C and 8D. FIG. 8F is a bottom perspective view of an enantiomorph of the chiral object of FIG. 8E. Referring back to FIG. 8C, it shall be noted that the chiral object 2 disposed at the tip of the toy piece 84 is essentially identical to the plurality of other chiral objects 2 of the toy piece 84. Upon inserting the chiral object in the corresponding opening 94 of the box 78, the user is faced with several other chiral objects 2 that are all orientated at their unique orientations. Referring now back to FIG. 8D, it shall be noted that the enantiomorph 4 of the chiral object disposed at the tip of the toy piece 86 is essentially identical to the plurality of other enantiomorphs 4 of the chiral object of the toy piece 86. Upon inserting the enantiomorph 4 of the chiral object in the corresponding opening 94 of the box 78, the user is faced with several other enantiomorphs 4 of the chiral object that are all orientated at their unique orientations. Referring back to FIGS. 8C-8F, the plurality of chiral objects 2 or enantiomorphs 4 of the chiral object are connected by a stem 88 where each adjacent pair of the chiral objects 2 or enantiomorphs 4 are disposed at an offset to enable each chiral object 2 or enantiomorph 4 to clear the corresponding opening 82, 94 of the box 78 before the next chiral object 2 or enantiomorph 4 can be orientated in a manner to again clear the same opening 82, 94. Once the last chiral object 2 or enantiomorph 4, i.e., the chiral object 2 or enantiomorph 4 closest to the cap 96 has cleared the same opening 82, 94, the toy piece 84, 86 is considered to have cleared all the hurdles to be seated on the lid 80. While not in use, all toy pieces may be stored within an interior space 98 of the box 78 to form a neat and compact package for stowage.

FIGS. 9A-9C are diagrams depicting a toy 100 including a separation apparatus useful for separating a chiral object from its enantiomorph with FIG. 9A being a top perspective view, FIG. 9B being a top view and FIG. 9C being a side view of the separation apparatus, respectively. Here, when a pair of enantiomorphs are disposed in the interior space 104 of the separation apparatus, one of the pair of enantiomorphs can easily be removed from the interior space by just shaking. The other one of the pair of enantiomorphs can only be removed by reorienting it, e.g., using the aid of a manual manipulation of it through at least one of the openings 102 of the separation apparatus. FIG. 10A is a side view of a toy 14 including a separation apparatus useful for separating a chiral object from its enantiomorph through opening 16. FIG. 10B is a side view of a toy 14 including a separation apparatus useful for separating a chiral object from its enantiomorph through opening 16.

Although not shown, it is also conceivable that the present separation apparatuses be embodied in desk stationeries, educational tools, pen holders, business card holders, desk organizers having channels, sieves, e.g., those useful for showing separation of chiral solids to teach organic chemistry, etc.

The detailed description refers to the accompanying drawings that show, by way of illustration, specific aspects and embodiments in which the present disclosed embodiments may be practiced. These embodiments are described in sufficient detail to enable those skilled in the art to practice aspects of the present invention. Other embodiments may be utilized, and changes may be made without departing from the scope of the disclosed embodiments. The various embodiments can be combined with one or more other embodiments to form new embodiments. The detailed description is, therefore, not to be taken in a limiting sense, and the scope of the present invention is defined only by the appended claims, with the full scope of equivalents to which they may be entitled. It will be appreciated by those of ordinary skill in the art that any arrangement that is calculated to achieve the same purpose may be substituted for the specific embodiments shown. This application is intended to cover any adaptations or variations of embodiments of the present invention. It is to be understood that the above description is intended to be illustrative, and not restrictive, and that the phraseology or terminology employed herein is for the purpose of description and not of limitation. Combinations of the above embodiments and other embodiments will be apparent to those of skill in the art upon studying the above description. The scope of the present disclosed embodiments includes any other applications in which embodiments of the above structures and fabrication methods are used. The scope of the embodiments should be determined with reference to the appended claims, along with the full scope of equivalents to which such claims are entitled.

What is claimed herein is:

1. A separation apparatus for separating a chiral object from its enantiomorph, said separation apparatus comprising:
a first enclosed channel comprising a first opening and a second opening, wherein said first opening comprising a first shape characterized by a first projection of the chiral object disposed in a first orientation and said second opening comprising a second shape characterized by a second projection of the chiral object disposed in a second orientation, wherein said first shape extends from said first opening through a first portion of said first enclosed channel, said second shape extends from said second opening through a second portion of said first enclosed channel to coincide with said first portion of said first enclosed channel to form an intersection having a surface complementary to the chiral object disposed in the first orientation with respect to said first opening and the second orientation with respect to said second opening, wherein when the chiral object is disposed in the first orientation, the chiral object comprises a third projection matching said first shape and a fourth projection matching said second shape, the chiral object is separable from an enantiomorph of the chiral object via at least one of said first opening and said second opening.

2. The separation apparatus of claim 1, further comprising:
a second enclosed channel comprising a third opening and a fourth opening, wherein said third opening comprising a third shape characterized by a first projection of the enantiomorph of the chiral object disposed in a third orientation and said fourth opening comprising a fourth shape characterized by a second projection of the enantiomorph of the chiral object disposed in a fourth orientation, wherein said third shape extends from said third opening through a first portion of said second enclosed channel and said fourth shape extends from said fourth opening through a second portion of said second enclosed channel to coincide with said first portion of said second enclosed channel, wherein when the enantiomorph of the chiral object is disposed in the third orientation, the enantiomorph of the chiral object comprises a fifth projection matching said third shape and a sixth projection matching said fourth shape, the enantiomorph of the chiral object is separable from the chiral object via at least one of said third opening and said fourth opening.

3. The separation apparatus of claim 2, wherein said third orientation and said fourth orientation are disposed at a right angle to one another.

4. The separation apparatus of claim 2, wherein said third orientation and said fourth orientation are disposed at an angle other than a right angle to one another.

5. The separation apparatus of claim 2, wherein said third opening comprises an area and the area of said first projection of the enantiomorph of the chiral object is smaller than said first area by about 1-5% of the area of said third opening.

6. The separation apparatus of claim 2, wherein at least one of said first enclosed channel and said second enclosed channel is non-rectilinear.

7. The separation apparatus of claim 1, wherein said first orientation and said second orientation are disposed at a right angle to one another.

8. The separation apparatus of claim 1, wherein said first orientation and said second orientation are disposed at an angle other than a right angle to one another.

9. The separation apparatus of claim 1, wherein said first opening comprises an area and the area of said first projection of the chiral object is smaller than said area by about 1-5% of the area of said first opening.

10. The separation apparatus of claim 1, wherein the chiral object is an object selected from the group consisting of a structure exhibiting symmetry elements or characterizations of one of C1, Cn, Dn, T, O and I.

11. The separation apparatus of claim 1, wherein the chiral object is a tetragonal pentagonal dodecahedron.

12. The separation apparatus of claim 1, wherein each of said first opening and said second opening is asymmetrical in shape.

13. A separation apparatus for separating a chiral object from an enantiomorph of the chiral object, said separation apparatus comprising:
a first opening and a second opening, wherein said first opening comprising a first shape characterized by a first projection of the chiral object disposed in a first orientation and said second opening comprising a second shape characterized by a second projection of an enantiomorph of the chiral object,
wherein when the chiral object is disposed in the first orientation, the chiral object comprises a third projection matching said first shape, the chiral object is separable from the enantiomorph of the chiral object via at least one of said first opening and said second opening.

14. The separation apparatus of claim 13, wherein said first opening and said second opening are opposingly disposed from one another and said first opening and said second opening are connected to one another.

15. The separation apparatus of claim 13, wherein the chiral object is an object selected from the group consisting of a structure exhibiting symmetry elements or characterizations of one of C1, Cn, Dn, T, O and I.

16. The separation apparatus of claim 13, wherein the chiral object is separable from the enantiomorph of the chiral object via at least one of said first opening and said second opening with the aid of free falling by gravity through said at least one of said first opening and said second opening.

17. The separation apparatus of claim 13, wherein the chiral object is separable from the enantiomorph of the chiral object via at least one of said first opening and said second opening by flipping said at least one of said first opening and said second opening upside down.

18. The separation apparatus of claim 13, wherein each of said first opening and said second opening is asymmetrical in shape.

* * * * *